United States Patent
Uchino

(10) Patent No.: US 10,817,166 B2
(45) Date of Patent: Oct. 27, 2020

(54) INFORMATION PROCESSING APPARATUS, METHOD OF CONTROLLING INFORMATION PROCESSING APPARATUS, AND RECORDING MEDIUM

(71) Applicant: Konica Minolta, Inc., Tokyo (JP)

(72) Inventor: Satoshi Uchino, Toyokawa (JP)

(73) Assignee: Konica Minolta, Inc., Tokyo (JP)

(*) Notice: Subject to any disclaimer, the term of this patent is extended or adjusted under 35 U.S.C. 154(b) by 5 days.

(21) Appl. No.: 16/226,047

(22) Filed: Dec. 19, 2018

(65) Prior Publication Data
US 2019/0220165 A1 Jul. 18, 2019

(30) Foreign Application Priority Data

Jan. 12, 2018 (JP) ................... 2018-003690

(51) Int. Cl.
*G06F 3/0488* (2013.01)
*G06F 3/0486* (2013.01)
*G06F 3/0484* (2013.01)

(52) U.S. Cl.
CPC .......... *G06F 3/0488* (2013.01); *G06F 3/0486* (2013.01); *G06F 3/04845* (2013.01); *G06F 2203/04808* (2013.01)

(58) Field of Classification Search
CPC .. G06F 3/0488; G06F 3/04845; G06F 3/0486; G06F 2203/04808
See application file for complete search history.

(56) References Cited

U.S. PATENT DOCUMENTS

2014/0184526 A1* 7/2014 Cho .................. G06F 3/041
345/173
2019/0102135 A1* 4/2019 Lai .................. G06F 3/1446

FOREIGN PATENT DOCUMENTS

JP 2016-224804 A 12/2016

* cited by examiner

*Primary Examiner* — Robert J Michaud
(74) *Attorney, Agent, or Firm* — Osha Liang LLP

(57) ABSTRACT

An information processing apparatus includes: a plurality of devices each including a hardware processor; and a display shared among the devices, wherein in response to detection of a pointer in a display region of the display, the display transmits detected position information indicating a detected position of the pointer to each of the devices, and the hardware processor of one of the devices determines whether a user operation by the pointer is an operation directed to the one of the devices, in accordance with the detected position information received from the display.

19 Claims, 16 Drawing Sheets

INFORMATION PROCESSING APPARATUS, METHOD OF CONTROLLING INFORMATION PROCESSING APPARATUS, AND RECORDING MEDIUM

CROSS-REFERENCE TO RELATED APPLICATION

The entire disclosure of Japanese patent Application No. 2018-003690, filed on Jan. 12, 2018, is incorporated herein by reference in its entirety.

BACKGROUND

Technical Field

The present invention relates to an information processing apparatus and related technologies.

Description of the Related art

There have been techniques for transmitting detected position information indicating a detected position of a pointer (a user's finger or the like) from a display provided in an information processing apparatus to a control unit of the information processing apparatus, in response to detection of the pointer in the display region of the display.

For example, according to the technique disclosed in JP 2016-224804 A, a display of an information processing apparatus transmits detected position information (coordinate information) about the detected position of a user's finger to a control unit, in response to detection of the finger in the display region of the display of the information processing apparatus. The control unit then performs the process corresponding to a user operation (a touch operation), in accordance with the detected position information acquired from the display.

Meanwhile, the applicant of the present invention has suggested that one display is shared among devices in an information processing apparatus including the devices.

In a case where one display is shared among devices, the following technique can be adopted: the display performs a process of identifying the device (the operation target device) that is to perform the process corresponding to a user operation performed by a pointer among the devices (this identifying process is an operation target device identifying process), and the display transmits detected position information only to the device identified as the operation target device. According to this technique, these processes (such as the operation target device identifying process) are performed at a CPU provided in the display.

In adopting this technique, however, it is necessary to perform the above processes, using the CPU provided in the display. Because of this, a CPU must be newly provided in the display.

SUMMARY

In view of the above, one or more embodiments of the present invention provide an information processing apparatus that includes a plurality of devices and a display shared among the devices, and a technique for enabling appropriate operations in the respective devices, without providing a CPU in the display to perform a process of identifying the operation target device of a user operation.

According to one or more embodiments of the present invention, an information processing apparatus comprises: a plurality of devices each including a hardware processor; and a display shared among the plurality of devices, wherein in response to detection of a pointer of a user in a display region of the display, the display transmits detected position information indicating a detected position of the pointer to each of the devices, and the hardware processor of each of the devices determines whether a user operation by the pointer is an operation directed to the device, in accordance with the detected position information received from the display.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of the present invention will be described with reference to the drawings.

However, the scope of the invention is not limited to the disclosed embodiments.

<1-1. Configuration Overview>

Figure 1:
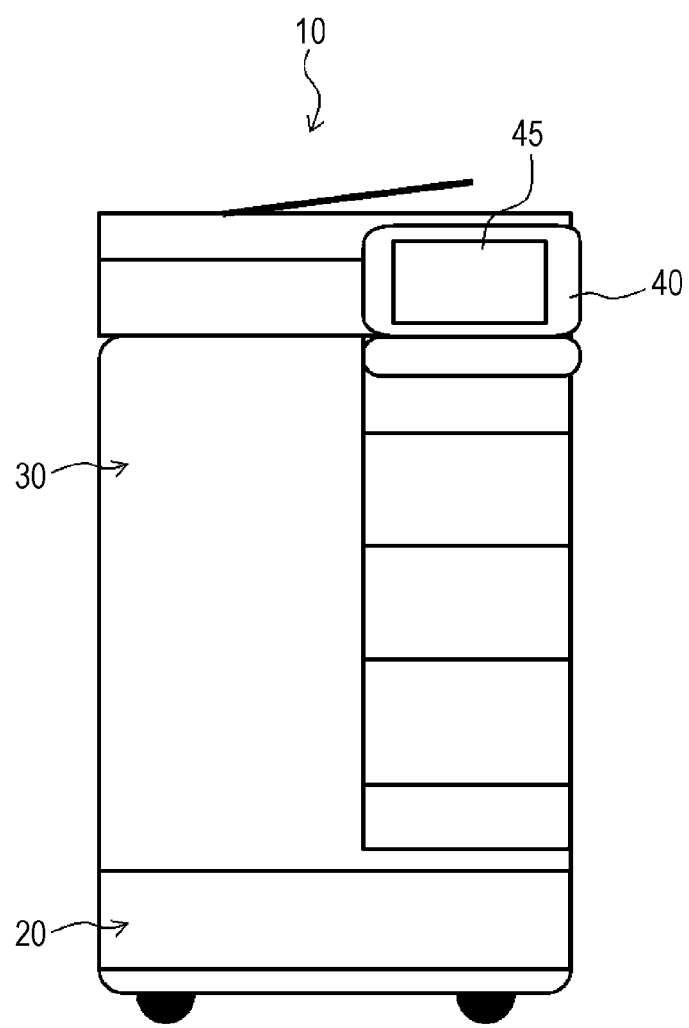
FIG. 1 is a diagram showing the exterior of an MFP (an information processing apparatus) according to one or more embodiments of the present invention.

FIG. 1 is a diagram showing the exterior of a multi-functional peripheral (MFP) 10. In this drawing, the MFP 10 is shown as an example of an information processing apparatus. The MFP 10 is also referred to as an image forming apparatus or an image processing apparatus.

Figure 2:
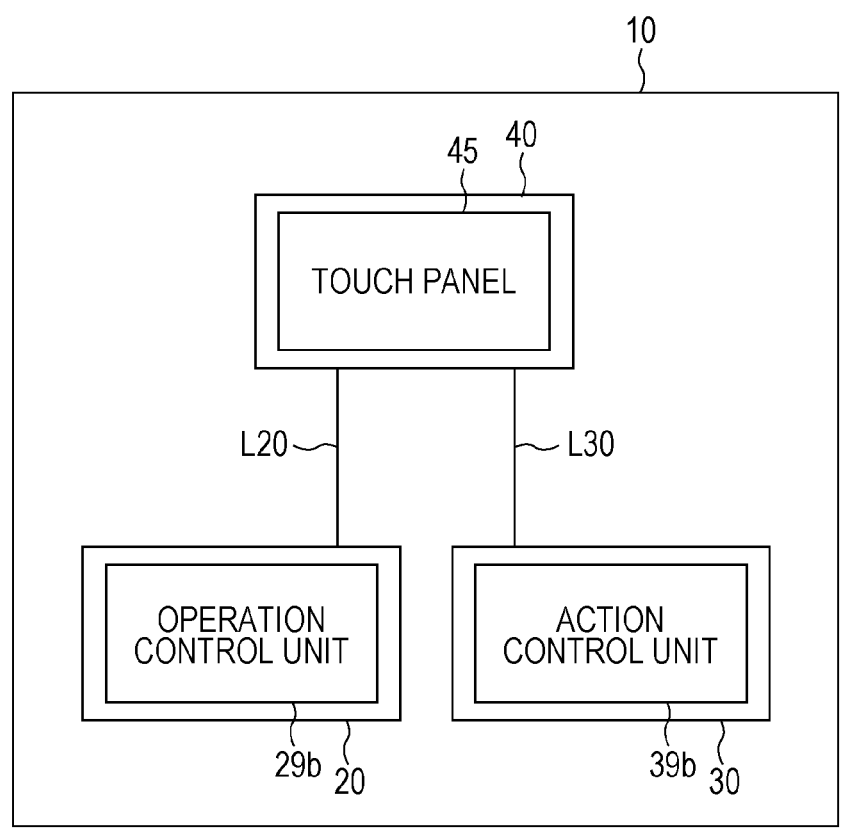
FIG. 2 is a block diagram schematically showing the configuration of the MFP according to one or more embodiments of the present invention.

FIG. 2 is a block diagram schematically showing the configuration of the MFP 10.

The MFP 10 includes devices (two devices: a server device 20 and an image forming device 30 in this example) that operate independently of each other. Here, the server device 20 and the image forming device 30 are accommodated in one casing, and are integrally formed. The one casing includes a predetermined member and a component that can be opened and closed with respect to the predetermined member (the component may be a document cover designed to be able to rotate about a rotating shaft provided on the platen of the MFP 10).

The MFP 10 also includes an operation display 40 (also shown in FIG. 1). As will be described later, the operation display 40 is shared by the devices 20 and 30.

<1-2. Configuration of the Image Forming Device 30>

The image forming device 30 (also shown in FIG. 1) is a device capable of executing various types of jobs (such as copy jobs and scan jobs). The image forming device 30 is also referred to as an MFP device.

Figure 3:
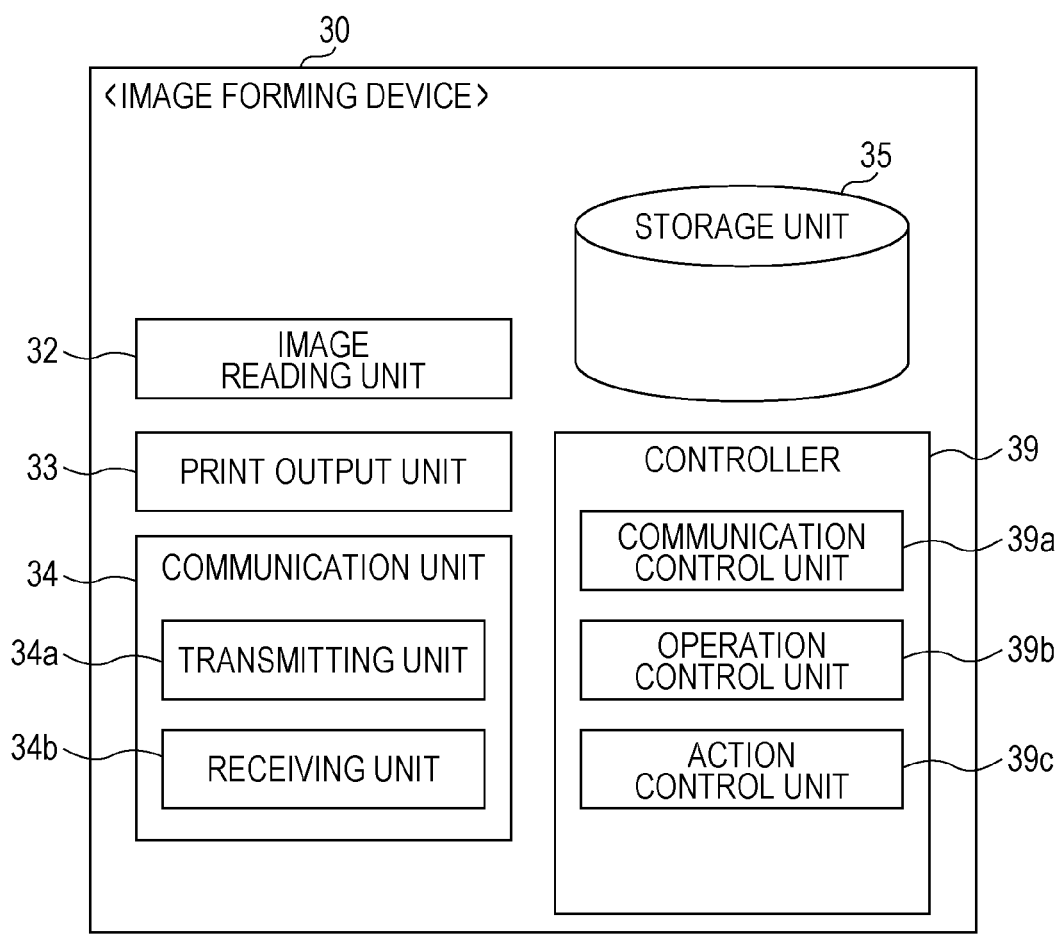
FIG. 3 is a diagram showing the functional blocks of an image forming device according to one or more embodiments of the present invention.

FIG. 3 is a diagram showing the functional blocks of the image forming device 30. The image forming device 30 manages a copy function, a scan function, a facsimile function, a box print function, and the like. Specifically, as shown in FIG. 3, the image forming device 30 includes an image reading unit 32, a print output unit 33, a communication unit 34, a storage unit 35, and a controller (control unit) 39, and achieves the various functions by causing the respective components to operate in combination.

The image reading unit 32 is a processing unit that optically reads (or scans) a document placed at a predetermined position (an auto document feeder (ADF) or a glass surface) of the image forming device 30, and generates image data (also referred to as a document image or a scanned image) of the document. The image reading unit 32 is also referred to as a scan unit or the like. The image forming device 30 is a device capable of reading a document placed at a predetermined position, and is also referred to as an image reading device.

The print output unit 33 is an output unit that prints and outputs images onto various kinds of media, such as paper, in accordance with data relating to the print target. The image forming device 30 is a device capable of printing and outputting images onto various kinds of media, and is also called a print output device.

The communication unit 34 is a processing unit capable of performing facsimile communication via a public line or the like. The communication unit 34 can further perform network communication via a network. In the network communication, various kinds of protocols such as TCP/IP (Transmission Control Protocol/Internet Protocol) are used, for example. By using the network communication, the image forming device 30 can exchange various kinds of data with a desired destination.

The storage unit 35 is formed with various storage devices (such as a (volatile and/or nonvolatile) semiconductor memory and/or a hard disk drive (HDD)).

The controller 39 is a control device that is incorporated in the image forming device 30 and comprehensively controls the image forming device 30. The controller 39 is formed as a computer system that includes a central processing unit (CPU) (also referred to as a microprocessor or a computer processor) and various semiconductor memories (a RAM and a ROM). The controller 39 functions as the respective processing units through the CPU executing a predetermined software program (hereinafter also referred to simply as the program) stored in a ROM (such as an EEPROM (registered trademark)). It should be noted that the program (more specifically, a program module group) may be recorded in a portable recording medium such as a USB memory, be read out from the recording medium, and be installed into the image forming device 30. Alternatively, the program may be downloaded via a network, and be installed into the image forming device 30.

Specifically, as shown in FIG. 3, the controller 39 functions as various kinds of processing units including a communication control unit 39a, an operation control unit 39b, and an action control unit 39c by executing the program.

The communication control unit 39a is a processing unit that cooperates with the communication unit 34 and the like, to communicate with other devices (including the other devices (such as the server device 20) in the same casing (the same apparatus), and other devices included in another apparatus formed in another casing).

The operation control unit 39b is a processing unit that cooperates with the operation display 40 (see FIG. 1), to control input operations performed on the operation display 40 (particularly, a touch panel 45 (see FIG. 1)), and control display operations (display output operations) performed on the operation display 40 (particularly, the touch panel 45). For example, the operation control unit 39b causes the operation display 40 (the touch panel 45) to display a display screen (such as a screen for setting various kinds of jobs) for the image forming device 30. More specifically, the operation control unit 39b transmits a display image (display image data) of the display screen for the image forming device 30 to the touch panel 45 via a signal line L30 (FIG. 2), and causes the touch panel 45 to display the display screen. The operation control unit 39b also acquires (receives) detected position information 100 (110) (see FIG. 5 and others) from the operation display 40 via the signal line L30. The detected position information 100 (touch coordinate information) is information indicating the detected position of a user's pointer (for example, a user's finger) detected in a display region 400 (FIG. 5 and others) of the touch panel 45. Although a user's finger is shown as an example of a pointer here, the pointer is not necessarily a user's finger, and may be a pen-shaped input member or the like.

The operation control unit 39b also performs a determination process to determine whether a user operation performed by a pointer (a finger) of a user is an operation directed to its own device 30, in accordance with the detected position information 100 (110) received from the operation display 40. In other words, the operation control unit 39b determines whether its own device 30 is the operation target device (the device to perform a process according to a user operation).

The action control unit 39c is a processing unit that controls various kinds of operations (such as job operations) in the image forming device 30.

The above described various operations are performed primarily by the CPU of the controller 39 executing a software program. However, the above described various operations are not necessarily performed in that manner, but may be performed with dedicated hardware or the like provided in the image forming device 30 (specifically inside or outside the controller 39). For example, all or some of the communication control unit 39a, the operation control unit 39b, the action control unit 39c (FIG. 3), and the like may be formed with one or more pieces of dedicated hardware.

<1-3. Configuration of the Server Device 20>

The server device 20 (also shown in FIG. 1) is a device capable of achieving a server function. The server device 20 is formed as a general-purpose computer device, for example.

Figure 4:
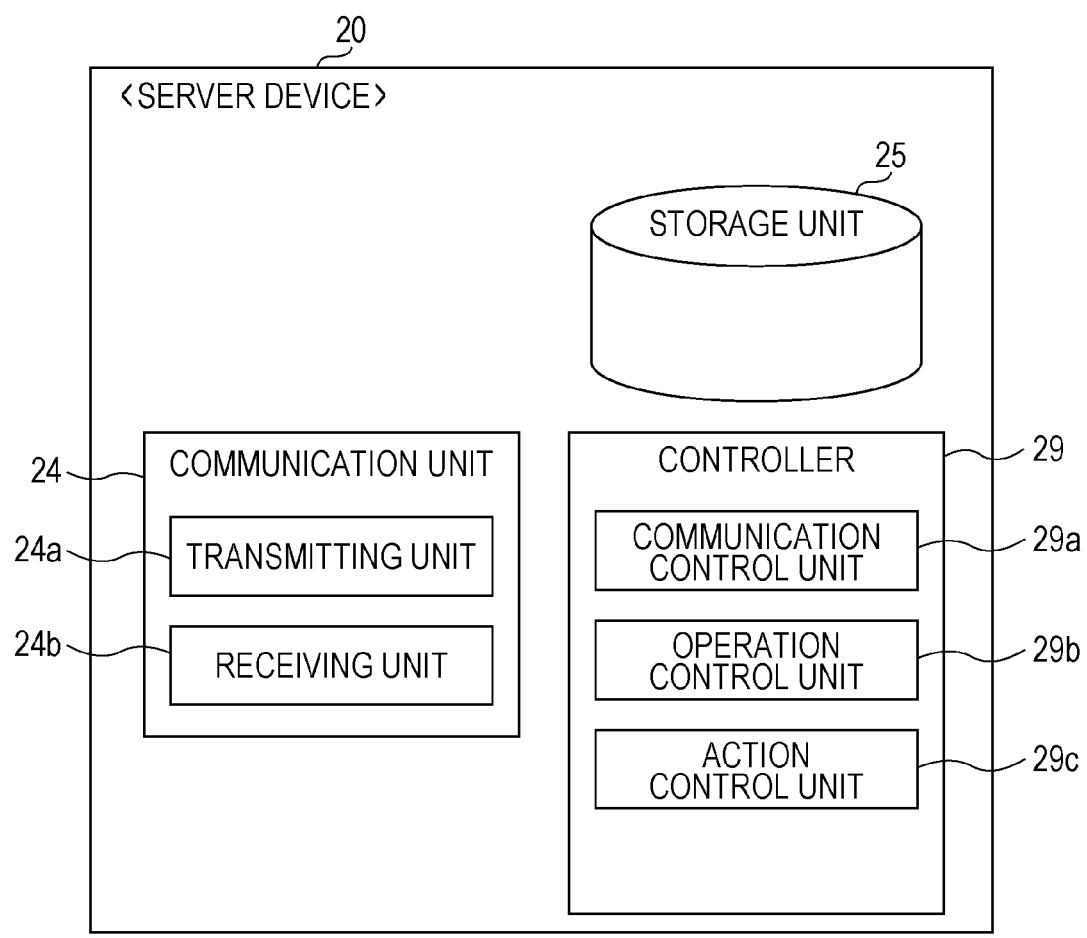
FIG. 4 is a diagram showing the functional blocks of a server device according to one or more embodiments of the present invention.

FIG. 4 is a diagram showing the functional blocks of the server device 20.

As shown in the functional block diagram in FIG. 4, the server device 20 includes a communication unit 24, a storage unit 25, and a controller (control unit) 29, and achieves various functions by causing the respective components to operate in combination.

The communication unit 24 is capable of performing network communication. In the network communication, various kinds of protocols such as TCP/IP (Transmission Control Protocol/Internet Protocol) are used, for example. By using the network communication, the server device 20 can exchange various kinds of data in cooperation with a desired destination.

The storage unit 25 is formed with various storage devices (such as a (volatile and/or nonvolatile) semiconductor memory and/or a hard disk drive (HDD)).

The controller (control unit) 29 is a control device that is incorporated in the server device 20 and comprehensively controls the server device 20. The controller 29 is formed as a computer system including a CPU, various kinds of semiconductor memories (a RAM and a ROM), and the like. The controller 29 realizes various processing units with the CPU executing a predetermined program stored in the storage unit 25 (a semiconductor memory or the like). It should be noted that the program (more specifically, a program module group) may be recorded in a portable recording medium such as a USB memory, be read out from the recording medium, and be installed into the server device 20. Alternatively, the program may be downloaded via a network, and be installed into the server device 20.

Specifically, the controller 29 functions as various kinds of processing units including a communication control unit 29a, an operation control unit 29b, and an action control unit 29c by executing the program or the like.

The communication control unit 29a is a processing unit that cooperates with the communication unit 24 and the like, to communicate with other devices (including the other devices (such as the image forming device 30) in the same casing (the same apparatus), and other devices included in another apparatus formed in another casing).

The operation control unit 29b is a processing unit that cooperates with the operation display 40, to control input operations performed on the operation display 40 (particularly, the touch panel 45), and control display operations performed on the operation display 40 (particularly, the touch panel 45). For example, the operation control unit 29b causes the operation display 40 (the touch panel 45) to display a display screen relating to the functions (an e-mail function, a data saving function, a file format conversion function, an image editing function, and the like) being managed by the server device 20. More specifically, the operation control unit 29b transmits the display image data of the display screen for the server device 20 to the touch panel 45 via a signal line L20 (FIG. 2), and causes the touch panel 45 to display the display screen. The operation control unit 29b also acquires (receives) detected position information 100 (110) from the operation display 40 via the signal line L20.

The operation control unit 29b also performs a determination process to determine whether a user operation is an operation directed to its own device 20, in accordance with the detected position information 100 (110) received from the operation display 40. In other words, the operation control unit 29b determines whether its own device 20 is the operation target device of the user operation.

The action control unit 29c is a processing unit that controls various operations in the server device 20.

The server device 20 also manages the e-mail function, the data saving function, the file format conversion function, the image editing function, and the like. Specifically, applications (application software programs) for achieving the various functions are installed beforehand into the server device 20, and the server device 20 achieves the various functions using the respective applications.

The above described various operations are performed primarily by the CPU of the controller 29 executing a software program. However, the above described various operations are not necessarily performed in that manner, but may be performed with dedicated hardware or the like provided in the server device 20 (specifically inside or outside the controller 29). For example, all or some of the communication control unit 29a, the operation control unit 29b, the action control unit 29c (FIG. 4), and the like may be formed with one or more pieces of dedicated hardware.

<1-4. Configuration of the Operation Display 40>

This MFP 10 includes the panel-like operation display 40 (see FIG. 1). The operation display 40 has the touch panel 45 (see FIG. 1) on its front side. The touch panel (also referred to as the operation panel) 45 is formed with a liquid crystal display panel and various sensors and the like embedded in the liquid crystal display panel. The touch panel 45 is capable of detecting a pointer (a finger or the like) of the operator and accepting various kinds of operation inputs, as well as displaying various kinds of information. The touch panel 45 also functions as an operation input unit that accepts operations input to the touch panel 45, and also functions as a display that displays various kinds of information. It should be noted that this operation display 40 does not have a CPU (a control unit).

The operation display 40 is also shared between devices (the two devices of the server device 20 and the image forming device 30 in this example) provided in the MFP 10.

The touch panel 45 is capable of simultaneously displaying the respective display images of the devices (the two devices 20 and 30 in this example). In short, the touch panel 45 is capable of performing double-screen display (simultaneous double-screen display) (see FIG. 5 and others).

Specifically, the touch panel 45 has two adjacent display regions (a left display region 200 and a right display region 300 (FIG. 5)). The two display regions 200 and 300 are divided display regions formed by logically dividing (segmenting) the entire display region 400 (FIG. 5) of the touch panel 45. The respective display regions (the respective divided display regions) 200 and 300 may constantly have the same size (half the size of the touch panel 45). However, the display regions 200 and 300 do not necessarily have the same size, and the sizes of the display regions 200 and 300 may be changed independently of each other in accordance with a user operation or the like. For example, the sizes of the respective regions 200 and 300 may be changed in accordance with a boundary changing operation performed by a user, so that one of the regions 200 and 300 has one third of the size of the entire touch panel 45 while the other region has two thirds of the size of the entire touch panel 45.

The left display region 200 of the touch panel 45 displays a screen for the server device 20 (such as a display screen for an application in the server device 20). In other words, the left display region 200 is a divided display region (a divided display screen) that displays a display image relating to the server device 20.

The right display region 300 of the touch panel 45 displays a screen for the image forming device 30 (such as a screen for setting various kinds of jobs). In other words, the right display region 300 is a divided display region (a divided display screen) that displays a display image relating to the image forming device 30.

Figure 8:
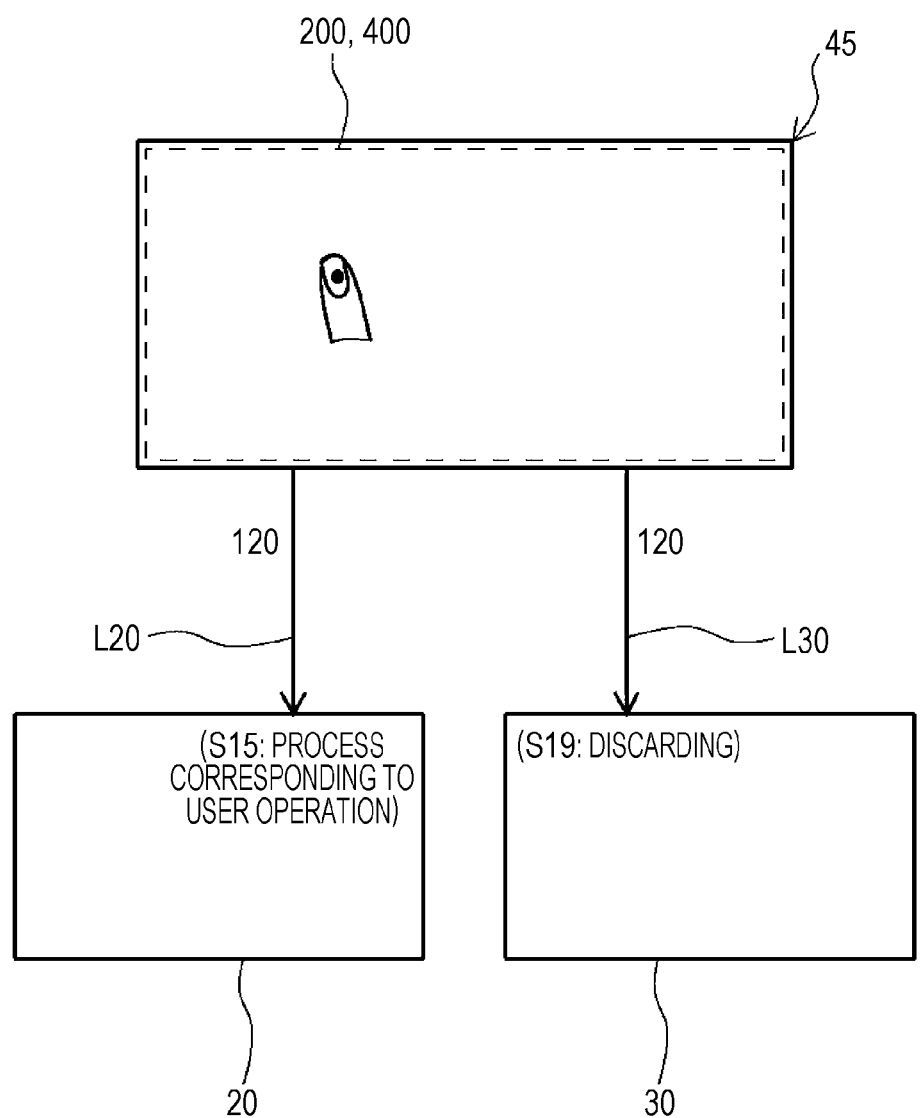
FIG. 8 is a diagram showing a situation where a pointer is detected in the display region of single-screen display according to one or more embodiments of the present invention.

The touch panel 45 is also capable of displaying only the display image of one of the devices 20 and 30 (for example, the server device 20). In short, the touch panel 45 is also capable of performing single-screen display (see FIG. 8). The single-screen display and the double-screen display (simultaneous double-screen display) are switched in accordance with a display switching operation or the like performed by a user, for example.

<1-5. Operation>

Figure 5:
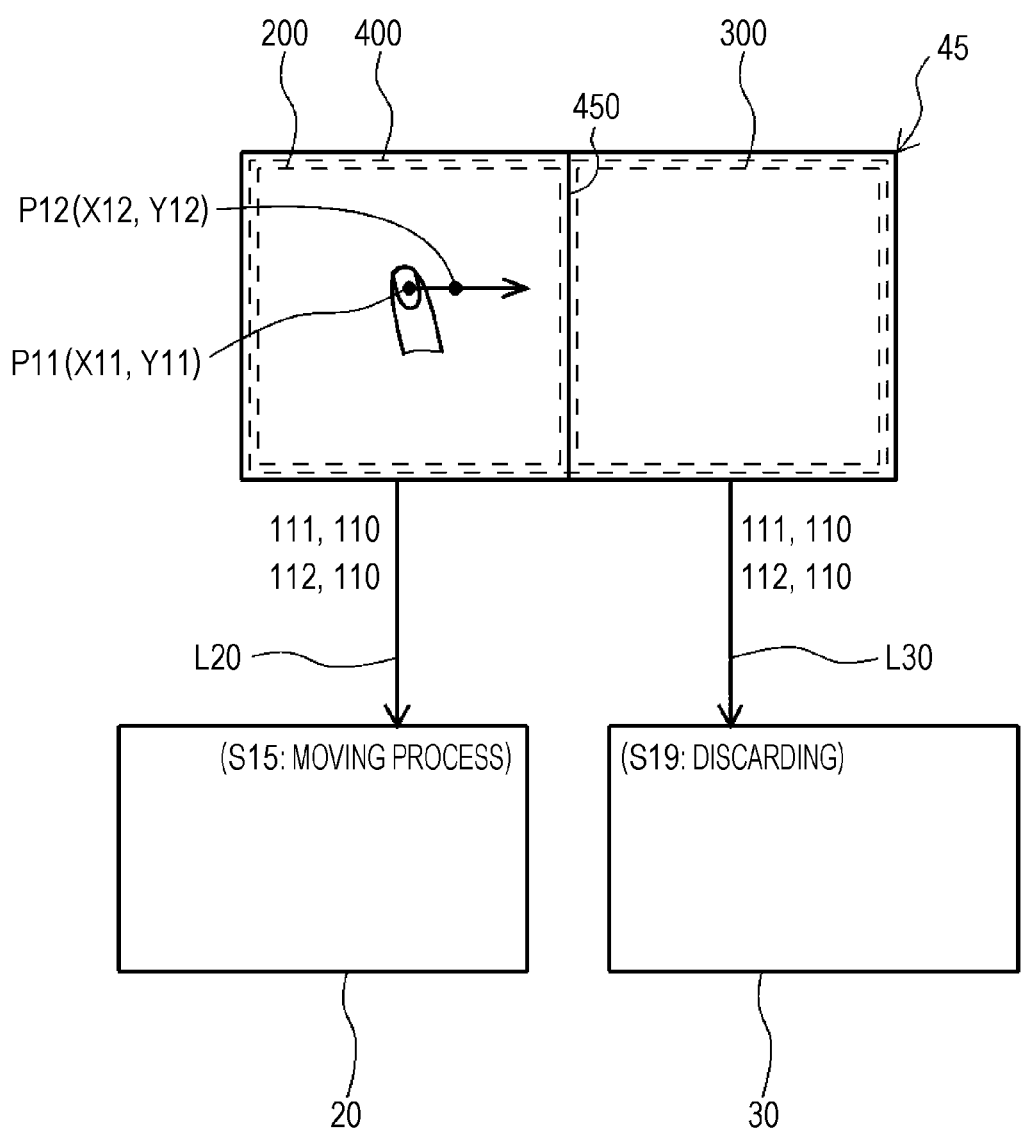
FIG. 5 is a diagram showing a situation where a pointer is detected in a left display region according to one or more embodiments of the present invention.

In response to detection of a user's pointer (a user's finger in this example) in the display region 400 of the touch panel 45, the operation display 40 of the MFP 10 transmits (sends) all the detected position information 110 (100) to the devices 20 and 30 (see FIG. 5 and others). In other words, the operation display 40 transmits the detected position information 110 to both the devices 20 and 30, regardless of the position of the pointer detected in the display region 400. Each of the control units 29 and 39 of the devices 20 and 30 determines whether a user operation is an operation directed to its own device, in accordance with the detected position information 110 from the operation display 40. In other words, the display does not identify the operation target device of a user operation, but each of the devices 20 and 30 determines whether its own device is the operation target device.

Such operations are described in detail below.

The operation display 40 transmits, to both the devices 20 and 30, pieces of detected position information 110 (111, 112, . . . ) relating to the respective detected positions (P11 (X11, Y11), P12 (X12, Y12), . . . ) (see FIG. 5) of a pointer during the period from detection of the pointer till detachment of the pointer from the touch panel 45 (or the period from the start of a drag operation till the end of the drag operation). For convenience of illustration, the distance between the detected position P11 and the next detected position P12 is relatively long in FIG. 5. In practice, however, the distance between the detected position P11 and the next detected position P12 is very short.

Specifically, in response to detection of a pointer at the position P11 (FIG. 5), the operation display 40 first transmits the first detected position information 111 (110) to both the server device 20 and the image forming device 30.

The operation display 40 then transmits the detected position information 112 (110) indicating the next detected position P12 (FIG. 5) of the pointer to both the devices 20 and 30.

The operation display 40 repeats such an operation as long as the operation to move the pointer continues (or until the pointer is removed from the touch panel 45 after the detection of the pointer).

Figure 6:
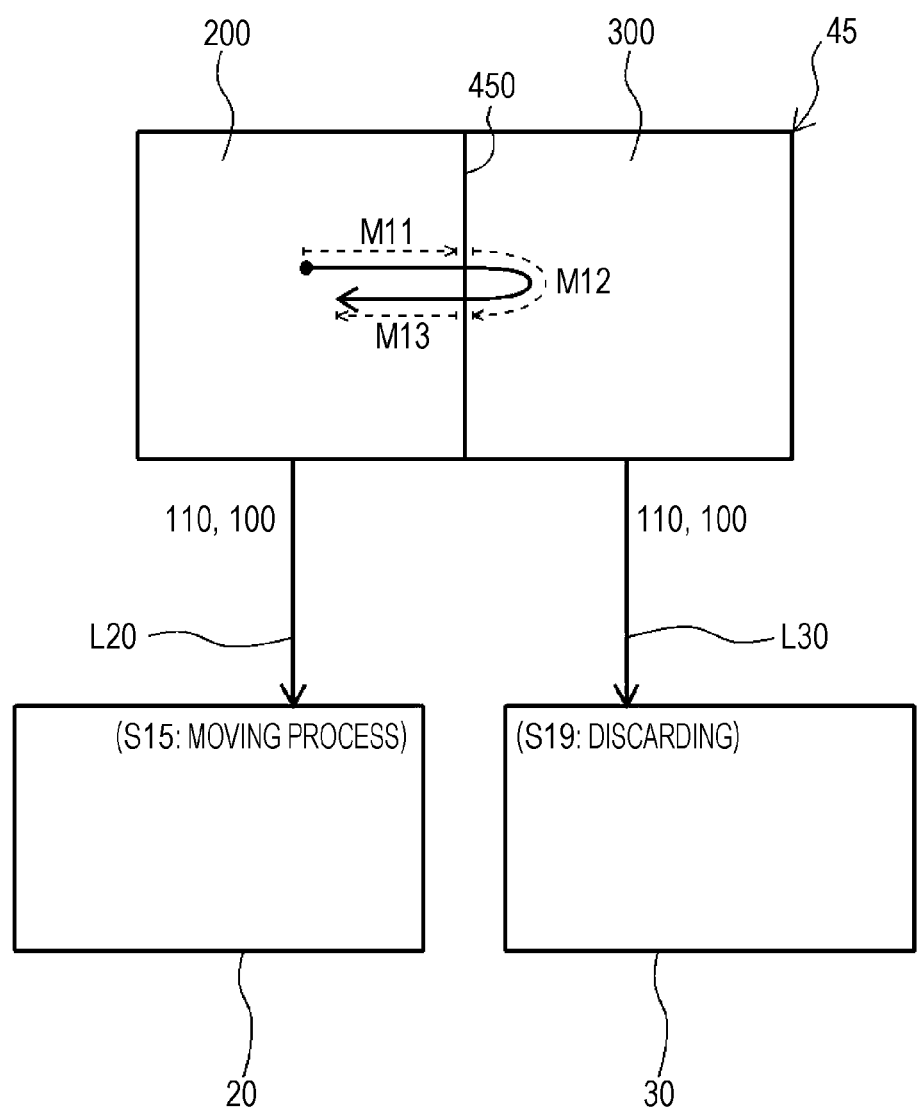
FIG. 6 is a diagram showing a situation where a pointer moves from the left display region to a right display region, and then moves from the right display region back to the left display region, according to one or more embodiments of the present invention.
Figure 7:
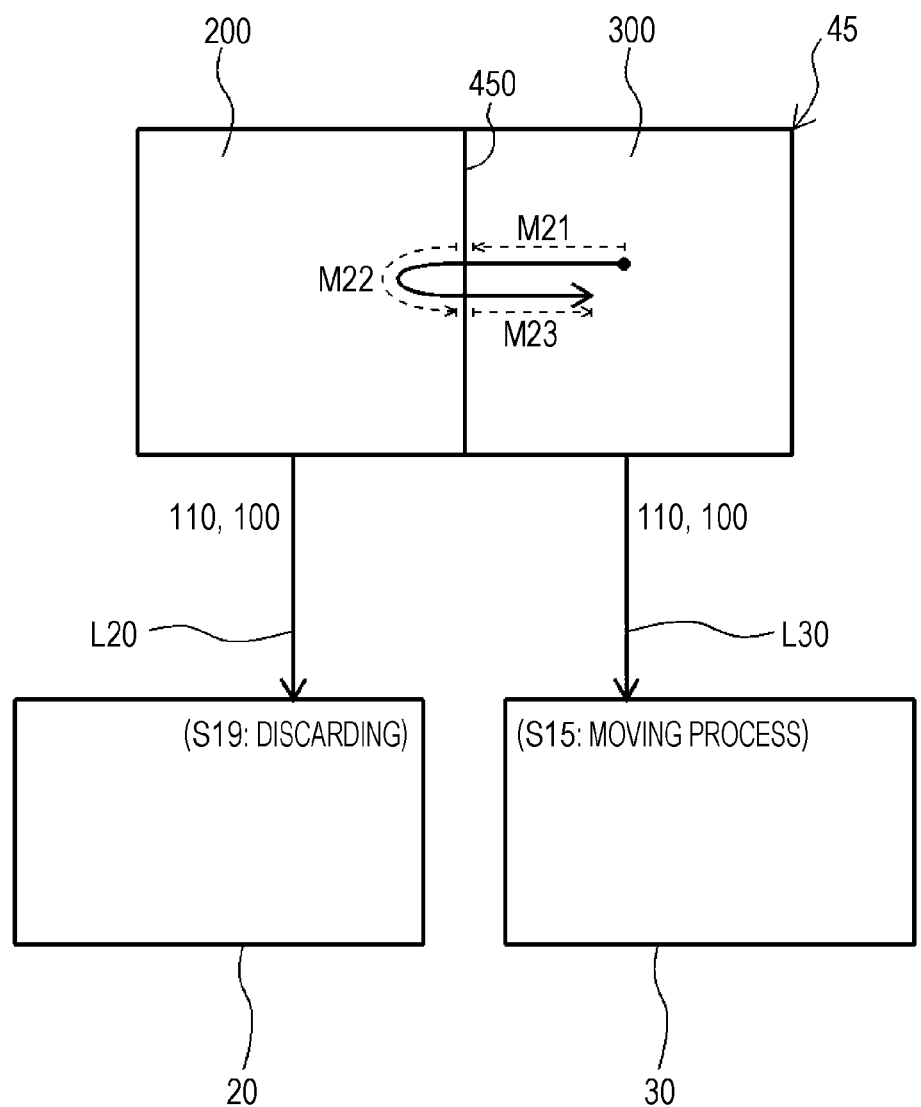
FIG. 7 is a diagram showing a situation where a pointer moves from the right display region to the left display region, and then moves from the left display region back to the right display region, according to one or more embodiments of the present invention.

Examples of the operation to move the pointer include the operations shown in FIGS. 6 and 7.

In FIG. 6, after a drag operation by a pointer (an operation to move a display element (an icon in this example)) is started in the left display region 200, the pointer moves from the left display region 200 to the right display region 300. After that, the pointer further moves to the left display region 200.

Specifically, in FIG. 6, a drag operation by a pointer (an operation to move a display element (an icon in this example)) is first started in the left display region 200. After that, in a movement interval M11 of the pointer, the pointer exists in the left display region 200. The movement interval M11 is the interval from the start of the drag operation by the pointer in the left display region 200 (or from the first detection of the pointer) until the crossing of a boundary line 450 by the pointer.

The pointer moves from the left display region 200 to the right display region 300 by crossing the boundary line 450 (a boundary portion). In a movement interval M12, the pointer exists in the right display region 300. The movement interval M12 is the interval from the crossing of the boundary line 450 by the pointer until re-crossing of the boundary line 450 by the pointer after the entry to the right display region 300.

After that, the pointer moves from the right display region 300 back to the left display region 200 by crossing the boundary line 450. In a movement interval M13, the pointer exists in the left display region 200. The movement interval M13 is the interval from the movement (return) of the pointer back to the left display region 200 after crossing of the boundary line 450 until arrival of the pointer at a certain position in the left display region 200.

In the case shown FIG. 7, after a moving operation by the pointer is started in the right display region 300, the pointer moves from the right display region 300 to the left display region 200, and further moves back to the right display region 300. As shown in FIG. 7, in movement intervals M21 and M23 of the pointer, the pointer exists in the right display region 300. In a movement interval M22 of the pointer, the pointer exists in the left display region 200. The movement interval M21 is the interval from the start of the drag operation by the pointer in the right display region 300 until the crossing of the boundary line 450 by the pointer. The movement interval M22 is the interval from the crossing of the boundary line 450 by the pointer until re-crossing of the boundary line 450 by the pointer after the entry to the left display region 200. The movement interval M23 is the interval from the movement (return) of the pointer back to the right display region 300 after crossing of the boundary line 450 until arrival of the pointer at a certain position in the right display region 300.

In each of the devices 20 and 30, a check is made to determine whether a user operation by a pointer is an operation directed to its own device, in accordance with the detected position information 110 (111, 112, . . . ) received from the operation display 40.

The description below will focus on an operation to be performed by the server device 20.

The server device 20 performs the following operation as the basic operation.

Specifically, in a case where the server device 20 determines that a pointer has been detected (at the present time) in "the divided display region 200 for its own device 20" (this region will be hereinafter also referred to as "the side of its own device 20"), the server device 20 determines that the user operation by the pointer is an operation directed to its own device 20. For example, in the movement intervals M11 and M13 in FIG. 6, the server device 20 determines that a pointer has been detected on the side of its own device 20, and determines that the user operation by the pointer is an operation directed to its own device 20. The server device 20 then performs a process (such as a process of moving an icon or the like) corresponding to the user operation.

In a case where the server device 20 determines that a pointer has been detected (at the present time) in "the divided display region 300 for the other device 30" (this region will be hereinafter also referred to as "the side of the other device 30"), the server device 20 determines that the user operation by the pointer is not an operation directed to its own device 20. For example, in the movement intervals M21 and M23 in FIG. 7, the server device 20 determines that a pointer has been detected on the side of the other device 30, and determines that the user operation by the pointer is not an operation directed to its own device 20. The server device 20 then discards the detected position information 110 received from the operation display 40, without performing the process according to the user operation.

The above operation is performed as the basic operation. However, in a case where such a basic operation is constantly performed, a process that is not intended by the user might be performed in the MFP 10.

For example, in a case where a finger of the user (accidentally) enters the right display region 300 (the movement interval M12 in FIG. 6) during a drag operation being performed in the left display region 200, the process (moving process) according to the drag operation being performed in the left display region 200 is suspended (at a position not intended by the user) when the above basic operation is performed by the server device 20.

In view of this, even in a case where the server device 20 determines that a pointer has been detected on the side of the other device 30, if the pointer is detected on the side of the other device 30 because the pointer has moved to the side of the other device 30 while a pressing operation started on the side of its own device 20 is being continued, the server device 20 exceptionally determines that the user operation is an operation directed to its own device 20.

Further, in a case where a finger of the user (accidentally) enters the left display region 200 (the movement interval M22 in FIG. 7) during a drag operation being performed in the right display region 300, the process (moving process) according to the drag operation being performed in the right display region 300 is suspended (at a position not intended by the user) when the above basic operation is performed by the server device 20.

In view of this, even in a case where the server device 20 determines that a pointer has been detected on the side of its own device 20, if the pointer is detected on the side of its own device 20 because the pointer has moved to the side of its own device 20 while a pressing operation started on the side of the other device 30 is being continued, the server device 20 exceptionally determines that the user operation is not an operation directed to its own device 20.

Such an operation is performed as an exceptional operation in the server device 20.

Figure 9:
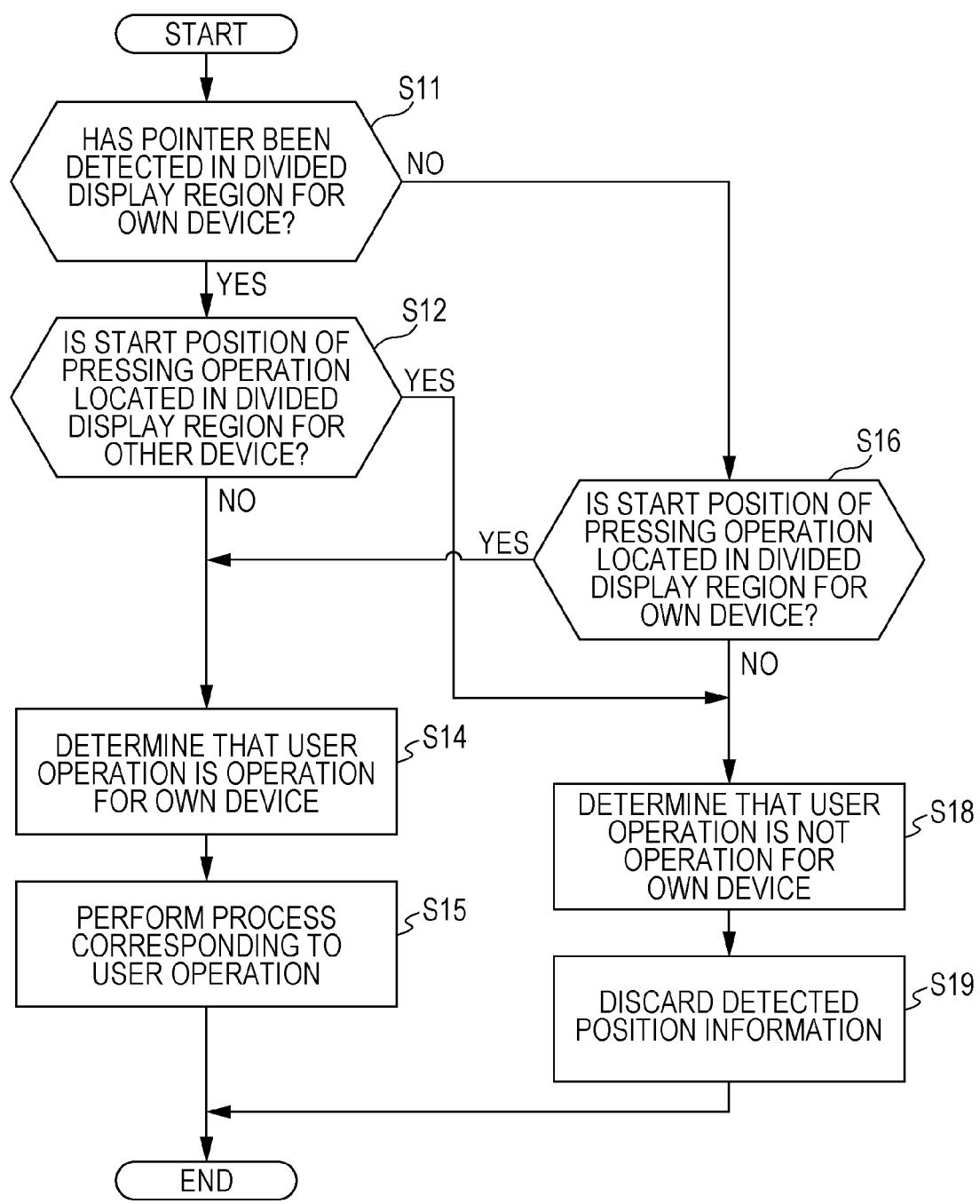
FIG. 9 is a flowchart showing an operation of each device according to one or more embodiments of the present invention.

Referring now to FIG. 9, the basic operation and the exceptional operations are now described in detail.

FIG. 9 is a flowchart showing an operation to be performed in the server device 20. The operation shown in FIG. 9 is started in the server device 20, in response to reception of detected position information 110 (100) from the operation display 40.

As will be described later, in the movement intervals M11 and M13 (FIG. 6), the process moves on to step S14 (and step S15) after steps S11 and S12, and the server device 20 determines that the user operation is an operation directed to its own device 20 according to the principles.

In the movement interval M12 (FIG. 6), the process moves on to step S14 (and step S15) after steps S11 and S16, and the server device 20 exceptionally determines that the user operation is an operation directed to its own device 20.

In the movement intervals M21 and M23 (FIG. 7), the process moves on to step S18 (and step S19) after steps S11 and S16, and the server device 20 determines that the user operation is not an operation directed to its own device 20 according to the principles.

In the movement interval M22 (FIG. 7), the process moves on to step S18 (and step S19) after steps S11 and S12, and the server device 20 exceptionally determines that the user operation is not an operation directed to its own device 20.

In the description below, the moving operation shown in FIG. 6 will be explained first, followed by explanation of the moving operation shown in FIG. 7.

In step S11, the server device 20 determines whether a pointer has been detected in the divided display region 200 for its own device 20, in accordance with detected position information 110 (100) (FIG. 6) received from the operation display 40. Specifically, the server device 20 holds coordinate information about the divided display region 200 for its own device 20 (the coordinate value of the point at the upper left end of the divided display region 200 and the coordinate value of the point at the lower right end of the divided display region 200), and, in accordance with the coordinate information, determines whether the detected position of the pointer exists within the divided display region 200.

For example, in the movement intervals M11 and M13 (FIG. 6), the pointer exists in the divided display region 200, and, in the movement intervals M11 and M13, the server device 20 determines that the pointer has been detected in the divided display region 200 for its own device 20 in step S11. The process then moves from step S11 on to step S12.

In the movement interval M12 (FIG. 6), on the other hand, the pointer exists in the divided display region 300, and, in the movement interval M12, the server device 20 in step S11 determines that the pointer has been detected in a different divided display region (the divided display region 300 in this case) from the divided display region 200 for its own device 20. The process then moves from step S11 on to step S16.

In steps S12 and S16, the server device 20 determines whether a pressing operation by the pointer has been started in the divided display region 200 for its own device 20, in accordance with press start information and press continuation information. The press start information is information indicating whether a pressing operation by the pointer (a pressing operation on the touch panel 45) has been started in the divided display region 200 for its own device 20, and the press continuation information is information indicating that the pressing operation started by the pointer in the divided display region 200 is being continued.

Specifically, the server device 20 determines "whether the pointer has been detected on the side of the other device 30 because the pointer has crossed the boundary line 450 from the side of its own device 20 and moved to the side of the other device 30 while a pressing operation started on the side of its own device 20 is being continued". In other words, a check is made to determine "whether the pointer has been detected on the side of the other device 30 because the pointer has crossed the boundary line 450 from the side of its own device 20 and moved to the side of the other device 30 while a pressing operation started on the side of its own device 20 is being continued".

In this example, as shown in FIG. 6, a pressing operation by the pointer has been started in the divided display region 200, and the pressing operation is continued in the movement intervals M11 through M13 after the start of the pressing operation.

Therefore, in the movement intervals M11 and M13 (FIG. 6), the server device 20 determines that the start position of the pressing operation by the pointer is not in the divided display region 300 for the other device 30 (and is in the divided display region 200 for its own device 20) (step S12). The process then moves from step S12 on to step S14.

In the movement interval M12 (FIG. 6), the pointer has moved from side of the server device 20 to the side of the image forming device 30 while the pressing operation started on the side of the server device 20 is being continued. Accordingly, the pointer is detected on the side of the image forming device 30, and the result of the determination in step S11 is "NO". The process then moves from step S11 on to step S16, and the server device 20 determines that the start position of the pressing operation by the pointer is in the divided display region 200 for its own device 20. After that, the process moves from step S16 on to step S14.

As described above, in the movement intervals M11 and M13, the process moves on to step S14 after steps S11 and S12, and, in the movement interval M12, the process moves on to step S14 after steps S11 and S16.

In step S14, the server device 20 determines that the user operation by the pointer is an operation directed to its own device 20. In other words, the server device 20 determines that its own device 20 is the operation target device (the device to perform the process according to the user operation). The process then moves from step S14 on to step S15, and the server device 20 performs the process according to the user operation in accordance with the detected position information 110.

For example, in the movement intervals M11 and M13, the server device 20 determines that the user operation is a drag operation directed to an icon in the divided display region 200, because the pressing operation by the pointer has been continued since the drag operation directed to the icon in the divided display region 200 was started in the divided display region 200. The server device 20 then performs, in the divided display region 200, the process (a process of moving the selected icon) corresponding to the user operation (the drag operation).

In the movement interval M12, the server device 20 also determines that the drag operation directed to the icon in the divided display region 200, because the pointer has moved from the side of its own device 20 to the side of the other device 30 by crossing the boundary line 450 while the pressing operation by the pointer has been continued since the start of the drag operation in the divided display region 200. The server device 20 then performs the process according to the user operation (the drag operation). However, even in a case where the pointer has moved from the side of the server device 20 to the side of the image forming device 30 (see the movement interval M12 in FIG. 6), the icon in the divided display region 200 is not moved to the side of the image forming device 30, and the icon is not displayed in the divided display region 300. In the movement interval M12, the server device 20 determines that the icon remains in a pressed state, and also displays the icon in the vicinity of the boundary line 450 (near the boundary line 450 in the divided display region 200) (step S15). It should be noted that, in response to the return of the pointer from the side of the other device 30 to the side of its own device 20 after the movement interval M12 (see the movement interval M13 in FIG. 6), the server device 20 resumes the process corresponding to the drag operation (the process of moving the icon).

Next, the moving operation shown in FIG. 7 is described.

In the movement intervals M21 and M23 (FIG. 7), a pointer exists in the divided display region 300, and, in the movement intervals M21 and M23, the server device 20 determines that the pointer has been detected in the divided display region 300 for the other device 30 in step S11. The process then moves from step S11 on to step S16.

In the movement interval M22 (FIG. 7), on the other hand, the pointer exists in the divided display region 200, and, in the movement interval M22, the server device 20 determines that the pointer has been detected in the divided display region 200 for its own device 20 in step S11. The process then moves from step S11 on to step S12.

In steps S12 and S16, the server device 20 determines whether a pressing operation has been started in the divided display region 200 for its own device 20.

In this example, as shown in FIG. 7, a pressing operation by the pointer has been started in the divided display region 300, and the pressing operation is continued in the movement intervals M21 through M23 after the start of the pressing operation.

Therefore, in the movement intervals M21 and M23, the server device 20 determines that the start position of the pressing operation by the pointer is not in the divided display region 200 for its own device 20 (step S16). The process then moves from step S16 on to step S18.

In the movement interval M22, the pointer has moved from side of the image forming device 30 to the side of the server device 20 while the pressing operation started on the side of the image forming device 30 is being continued. Accordingly, the pointer is detected on the side of the server device 20, and the result of the determination in step S11 is "YES". The process then moves from step S11 on to step S12, and the server device 20 determines that the start position of the pressing operation by the pointer is in the divided display region 300 for the other device 30 in step S12. After that, the process moves from step S12 on to step S18.

As described above, in the movement intervals M21 and M23 (FIG. 7), the process moves on to step S18 after steps S11 and S16, and, in the movement interval M22, the process moves on to step S18 after steps S11 and S12.

In step S18, the server device 20 determines that the user operation by the pointer is not an operation directed to its own device 20. In other words, the server device 20 determines that its own device 20 is not the operation target device of the user operation.

The process then moves from step S18 on to step S19, and the server device 20 discards the detected position information 100 received from the operation display 40 (see FIG. 7). In other words, the server device 20 does not perform the process corresponding to the user operation.

The above operation is performed in the server device 20.

In the image forming device 30, the same operation as the operation shown in FIG. 9 (the operation of the server device 20) is performed. However, determination results in the image forming device 30 are the opposite of the determination results in the server device 20. For example, in a case where the server device 20 determines that the user operation is an operation directed to its own device 20, the image forming device 30 determines that the user operation is not an operation directed to its own device 30. Further, in a case where the server device 20 determines that the user operation is not an operation directed to its own device 20, the image forming device 30 determines that the user operation is an operation directed to its own device 30.

Although the screen configuration of the touch panel 45 is for double-screen display in this example, the same operation can be performed even if the screen configuration of the touch panel 45 is for single-screen display. For example, in a case where only the display image from the server device 20 is displayed in the display region 400 (FIG. 8), the operation display 40 transmits detected position information 120 (100) about a pointer detected in the display region 400 to both the server device 20 and the image forming device 30. Each of the devices 20 and 30 then determines whether the user operation is an operation directed to its own device (FIG. 9), in accordance with the detected position information 120 received from the operation display 40. Specifically, the server device 20 determines that the user operation is an operation directed to its own device 20, in accordance with the detected position information 120 (step S14). Meanwhile, the image forming device 30 determines that the user operation is not an operation directed to its own device 30, in accordance with the detected position information 120 (step S18).

As described above, in one or more embodiments of the present invention, in response to detection of a pointer in the display region 400 of the touch panel 45, the detected position information 110 (100) indicating the detected position of the pointer is transmitted from the operation display 40 to each of the devices 20 and 30 (see FIG. 5). Each of the devices 20 and 30 then determines whether the user operation by the pointer is an operation directed to its own device (FIG. 9). In other words, the operation display 40 does not perform a process of identifying the operation target device of the user operation, but each of the control units 29 and 39 (FIGS. 3 and 4) provided in the respective devices 20 and 30 determines whether the user operation is an operation directed to its own device. Accordingly, in the MFP 10 including the devices 20 and 30 and the operation display 40 shared between the devices 20 and 30, it is possible to accurately determine whether a user operation by a pointer is an operation directed to its own device, regardless of presence/absence of a CPU in the operation display 40. That is, operations can be appropriately performed in the respective devices 20 and 30.

Particularly, in a case where any CPU is not provided in the operation display 40, it is possible to avoid cost increase due to new provision of the CPU in the operation display 40.

Further, in one or more embodiments of the present invention, in a case where the server device 20 determines that a pointer has been detected on the side of the other device 30 because the pointer has moved from the side of its own device 20 to the side of the other device 30 while a pressing operation started on the side of its own device 20 is being continued (see the movement interval M12 in FIG. 6), the server device 20 exceptionally determines that the user operation is an operation directed to its own device 20. Likewise, in a case where the server device 20 determines that a pointer has been detected on the side of its own device 20 because the pointer has moved from the side of the other device 30 to the side of its own device 20 while a pressing operation started on the side of the other device 30 is being continued (see the movement interval M22 in FIG. 7), the server device 20 exceptionally determines that the user operation is not an operation directed to its own device 20. Thus, the server device 20 can flexibly determine whether a user operation is an operation directed to its own device 20.

Particularly, in a case where the server device 20 determines that a pointer has been detected on the side of the other device 30 because the pointer has moved from the side of its own device 20 to the side of the other device 30 while a pressing operation by the pointer is being continued from the start of a drag operation on the side of its own device 20 (see the movement interval M12 in FIG. 6), the server device 20 determines that the drag operation is being continued. Accordingly, even in a case where a finger of the user (unintentionally) enters the side of the image forming device 30 during a drag operation being performed on the side of the server device 20, the process corresponding to the drag operation (a moving process) is not interrupted. Thus, the server device 20 can continue the process corresponding to the user operation accepted by its own device 20. In other words, it is possible to avoid an interruption of the process corresponding to the user operation accepted by the server device 20, despite the intention of the user.

In the above described embodiments, a drag operation is accepted in one of the divided display regions (FIGS. 6 and 7). However, the present invention is not limited to this. For example, a pinch-out operation (an enlarging operation to increase the distance between two pointers) may be accepted in one of the divided display regions.

Figure 10:
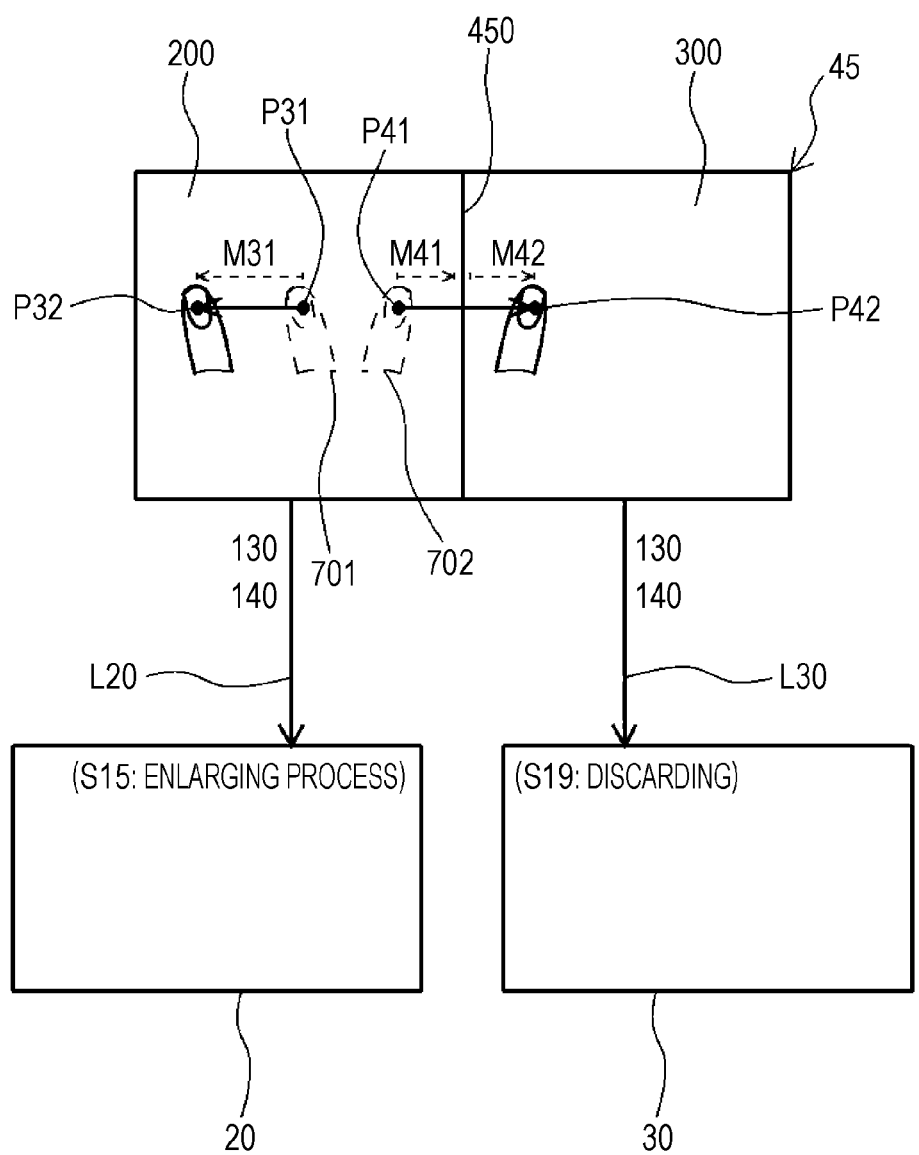
FIG. 10 is a diagram showing a situation where one of the pointers in a pinch-out operation moves from the left display region to the right display region according to one or more embodiments of the present invention.

A situation shown in FIG. 10 is now described. In this situation, after a pinch-out operation using two pointers 701 and 702 is started at positions P31 and P41 in the left display region 200, the distance between the two pointers 701 and 702 is made longer, and the pointer 702 moves from the position P41 to a position P42 in the divided display region 300.

When the two pointers 701 and 702 are detected in the display region 400, the operation display 40 transmits detected position information 130 relating to the pointer 701 and detected position information 140 relating to the pointer 702 to both the devices 20 and 30 (see FIG. 10).

The server device 20 then performs the operation shown in FIG. 9. Note that, prior to the operation shown in FIG. 9, the server device 20 determines (identifies) that the user operation is a pinch operation, because the two pointers 701 and 702 have been detected within a predetermined very short period T1 (such as 0.5 seconds) (or have been detected almost simultaneously).

In step S11, the server device 20 determines whether both of the two pointers 701 and 702 have been detected in the divided display region 200 for its own device 20.

In a case where both of the two pointers 701 and 702 have been detected in the divided display region 200 for its own device 20, the process moves from step S11 on to step S12.

For example, in movement intervals M31 and M41 (FIG. 10), both of the two pointers 701 and 702 exist in the divided display region 200, and the process moves on to step S14 after steps S11 and S12. The movement interval M31 is the interval from the start position P31 (FIG. 10) of the detection of the pointer 701 to a position P32 in the divided display region 200, and the movement interval M41 is the interval from the start position P41 (FIG. 10) of the detection of the pointer 702 to the boundary line 450.

The server device 20 then determines that the user operation (specifically, a pinch operation) is an operation directed to its own device 20 according to the principles (step S14), and performs the process according to the user operation in the divided display region 200 (step S15). Note that, in the movement intervals M31 and M41, the user operation is determined to be a pinch-out operation, because the distance between the pointers 701 and 702 is made longer.

In a case where both of the two pointers 701 and 702 have been detected in the divided display region 300 for the image forming device 30, on the other hand, the process moves from step S11 on to step S18 (and S19) after step S16, and the server device 20 determines that the user operation is not an operation directed to its own device 20.

In a case where only one of the two pointers 701 and 702 has been detected in the divided display region 200 for its own device 20, the process moves from step S11 on to step S16.

For example, in a movement interval M42 (FIG. 10), the pointer 702, which is one of the two pointers 701 and 702, exists in the divided display region 300, and the process moves from step S11 on to step S16. Specifically, in the movement interval M42, the pointer 702 has moved from side of the server device 20 to the side of the image forming device 30 while a pressing operation (a pressing operation by the pointer 702) started on the side of the server device 20 is being continued. Accordingly, the pointer 702 is detected on the side of the image forming device 30, and the result of the determination in step S11 is "NO". Note that the movement interval M42 is the interval from the boundary line 450 to the position P42 in the divided display region 300.

The process then moves from step S11 on to step S16, and the server device 20 determines that the start position of the pressing operation by the pointer is in the divided display region 200 for its own device 20. After that, the process moves from step S16 on to step S14, and the server device 20 exceptionally determines that the user operation (a pinch operation (more specifically, a pinch-out operation)) is an operation directed to its own device 20. More specifically, the server device 20 determines that the pinch-out operation in the divided display region 200 is being continued, because the pointer 702 has moved from the side of its own device 20 to the side of the other device 30 while the pressing operation by the two pointers 701 and 702 has been continued since the start of the pinch-out operation using the two pointers 701 and 702 on the side of its own device 20. The process then moves from step S14 on to step S15.

In step S15, the server device 20 performs the process (an enlarging process) corresponding to the user operation. Specifically, the server device 20 first calculates the amount of movement of the pointer 701 on the side of its own device 20, in accordance with the detected position information 130 relating to the pointer 701 detected on the side of its own device 20. The server device 20 also calculates the amount of movement of the pointer 702 on the side of the other device 30, in accordance with the detected position information 140 relating to the pointer 702 detected by the side of the other device 30. The server device 20 then performs the enlarging process on the divided display region 200, in accordance with the amount of movement of the pointer 701 on the side of its own device 20 and the amount of movement of the pointer 702 on the side of the other device 30. In this manner, the server device 20 performs the process (the enlarging process) corresponding to a pinch-out operation directed to its own device 20, taking into account the amount of movement of the pointer 702 that has entered the side of the image forming device 30.

In a case where the user further performs a pinch-in operation (a reducing operation to shorten the distance between the two pointers 701 and 702), and the pointer 702 moves from the side of the image forming device 30 to the side of the server device 20 in the divided display region 300, a reducing process that takes into account the amount of movement of the pointer 702 on the side of the image forming device 30 is performed (step S15).

Various modifications of the aforementioned embodiments are possible (particularly, a modification relating to an exceptional operation). The description below will focus on the differences from the aforementioned embodiments.

The aforementioned embodiments concern an example of a determining operation relating to a pinch operation started on the side of the device 20 (a pinch operation started in a state in which both of the two pointers 701 and 702 are in contact with the divided display region 200 for the device 20) (see FIG. 10).

Figure 11:
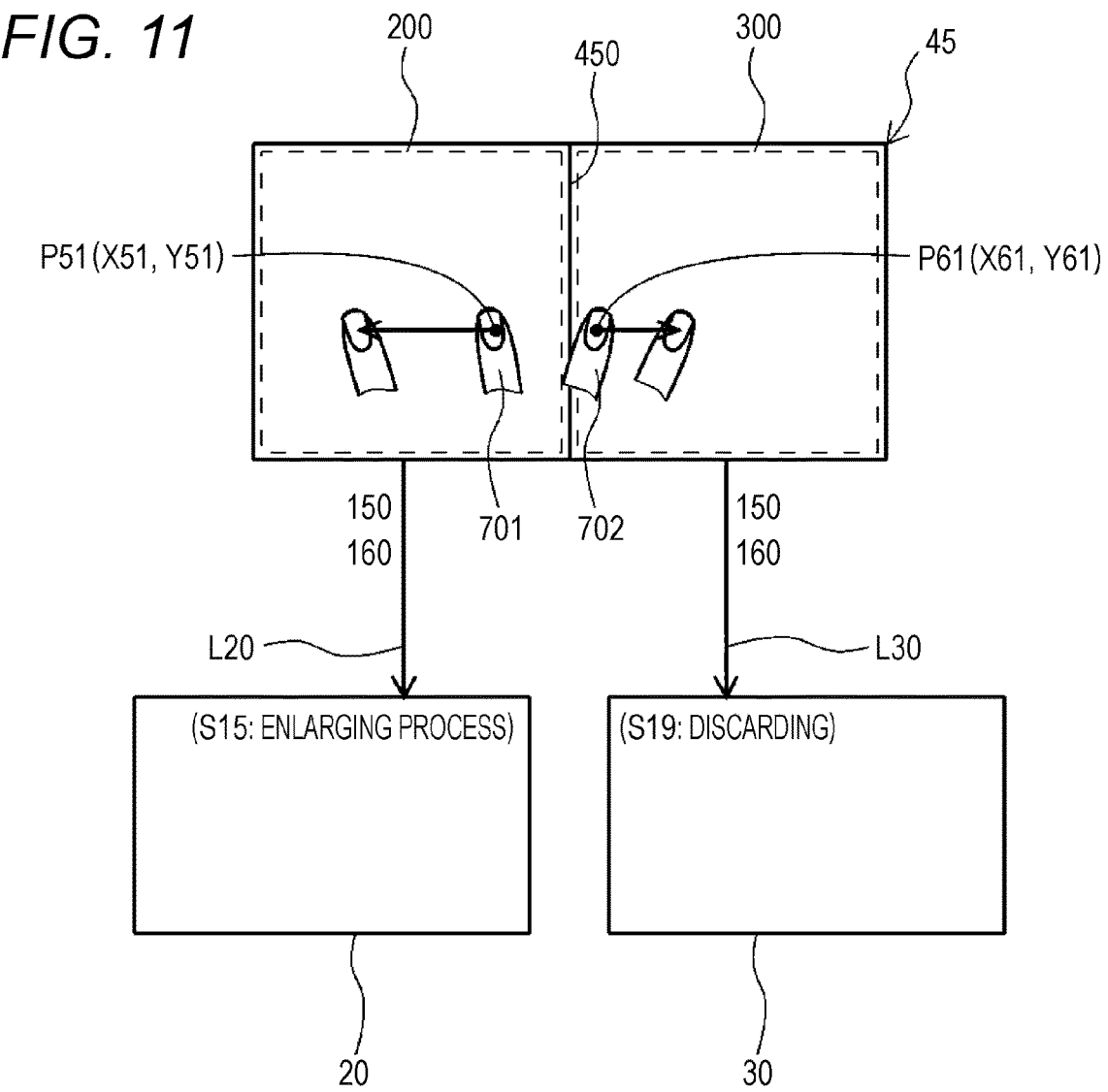
FIG. 11 is a diagram showing a situation where a pinch operation is started, with a boundary line being interposed between pointers, according to one or more embodiments of the present invention.

On the other hand, one or more embodiments of the present invention concern an example of a determining operation relating to a pinch operation started at two positions P51 and P61, with the boundary line 450 being interposed between the two positions P51 and P61 (see FIG. 11). Specifically, each of the devices 20 and 30 determines whether a pinch operation started in a state in which the pointer 701 of the two pointers 701 and 702 is in contact with the divided display region 200 for the device 20 while the other pointer 702 is in contact with the divided display region 300 for the other device 30 is an operation directed to its own device.

In a case where a pinch operation (a pinch-out operation or a pinch-in operation) is performed in the vicinity of the boundary line 450, the pointer 701 of the two pointers 701 and 702 in the pinch operation exists in one of the divided display regions, and the other pointer 702 exists in the other one of the divided display regions (FIG. 11). In short, a pinch operation might be started, with the boundary line 450 being interposed between the two pointers 701 and 702.

In a case where such a pinch operation is performed, according to the above described basic operation, the server device 20 performs a process relating to the pointer 701 on the side of its own device 20, and the image forming device 30 performs a process relating to the pointer 702 on the side of its own device 30. In other words, the processes corresponding to respective user operations by the pointers 701 and 702 are performed independently of each other in the respective devices 20 and 30. As a result, the process corresponding to the pinch operation by the two pointers 701 and 702 is not performed in the device desired by the user.

With this fact being taken into account in one or more embodiments of the present invention, in a case where each of the devices 20 and 30 determines that the two pointers 701 and 702 related to a pinch operation have been detected in different divided display regions from each other, each of the devices 20 and 30 determines whether the pinch operation is an operation directed to its own device, in accordance with the positional relationship between the boundary line 450 and the detected positions of the respective pointers 701 and 702.

The description below will focus on an operation to be performed by the server device 20.

Figure 13:
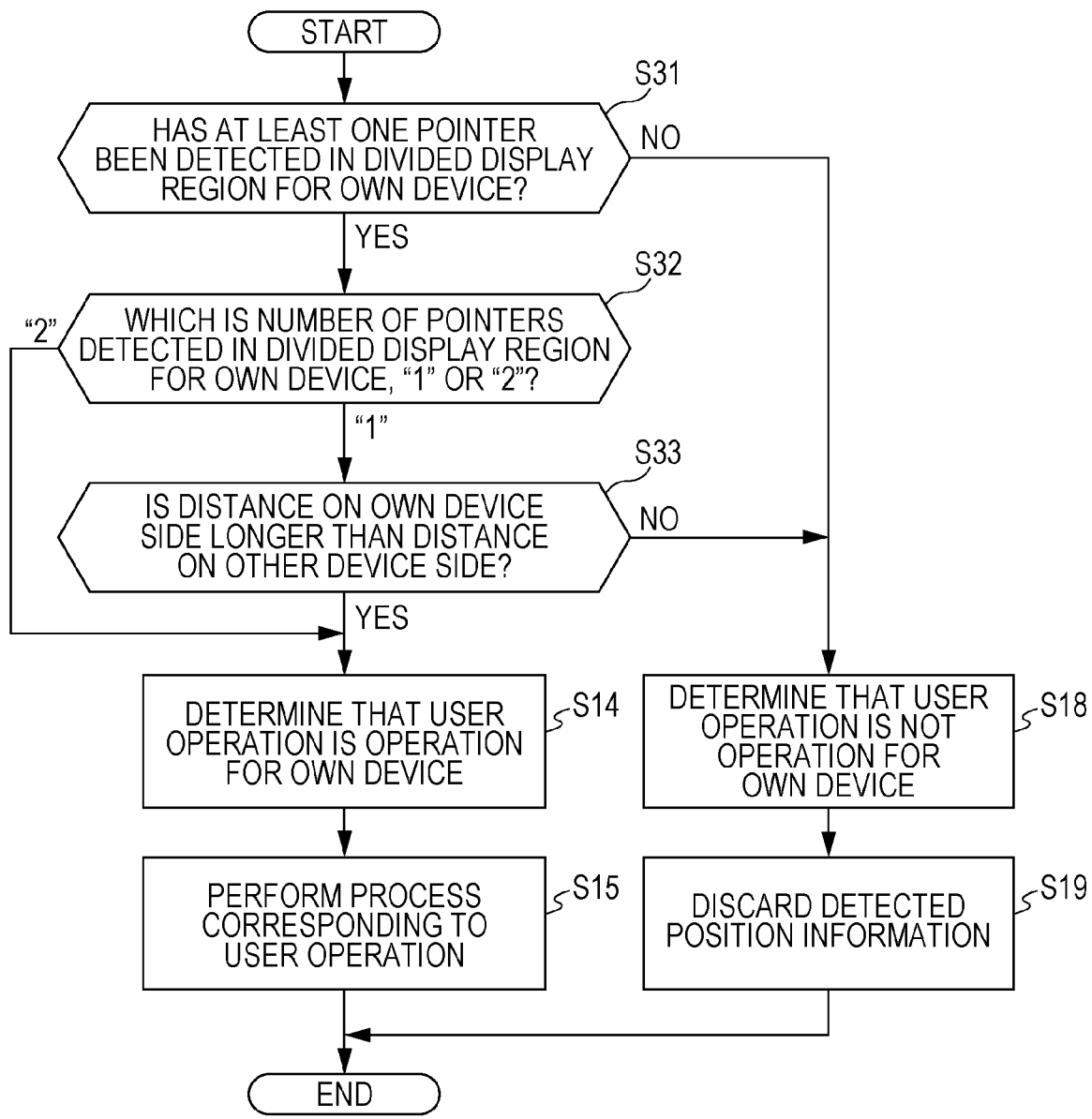
FIG. 13 is a flowchart showing an operation of each device according to one or more embodiments of the present invention.

FIG. 13 is a flowchart showing an operation of the server device 20 according to one or more embodiments of the present invention.

When the two pointers 701 and 702 are detected in the display region 400 within a very short period T1, the operation display 40 transmits detected position information 150 and 160 relating to the respective pointers 701 and 702 to each of the devices 20 and 30 (FIG. 11).

Upon receipt of the detected position information 150 and 160, the server device 20 starts the operation shown in FIG. 13. Note that, prior to the operation shown in FIG. 13, the server device 20 determines (identifies) that the user operation is a pinch operation, because the two pointers 701 and 702 have been detected within the very short period T1.

In step S31, the server device 20 determines whether at least one pointer has been detected in the divided display region 200 for its own device 20, in accordance with the detected position information 150 and 160 (FIG. 11). In this example, the server device 20 determines that one pointer (701) of the two pointers 701 and 702 has been detected in the divided display region 200 for its own device 20, and the process moves from step S31 on to step S32. In a case where it is determined that both of the two pointers 701 and 702 have been detected in the divided display region 300 for the image forming device 30, the process moves from step S31 on to steps S18 and S19. The procedures in steps S18 and S19 in FIG. 13 are the same as the procedures in steps S18 and S19 in FIG. 9 (see the aforementioned embodiments).

In step S32, the server device 20 determines the number of pointers detected in the divided display region 200 for its own device 20.

In this example, the pointer 701 of the two pointers 701 and 702 has been detected in the divided display region 200, and the other pointer 702 of the two pointers 701 and 702 has been detected in the divided display region 300 (FIG. 11). Therefore, the server device 20 determines in step S32 that the number of pointers detected in the divided display region 200 is "1", and the process then moves from step S32 on to step S33. Note that, in a case where it is determined that both of the two pointers 701 and 702 have been detected in the divided display region 200 for the server device 20, the number of pointers detected in the divided display region 200 is determined to be "2" in step S32, and the process then moves from step S32 on to steps S14 and S15. The procedures in steps S14 and S15 in FIG. 13 are the same as the procedures in steps S14 and S15 in FIG. 9 (see the aforementioned embodiments).

Figure 12:
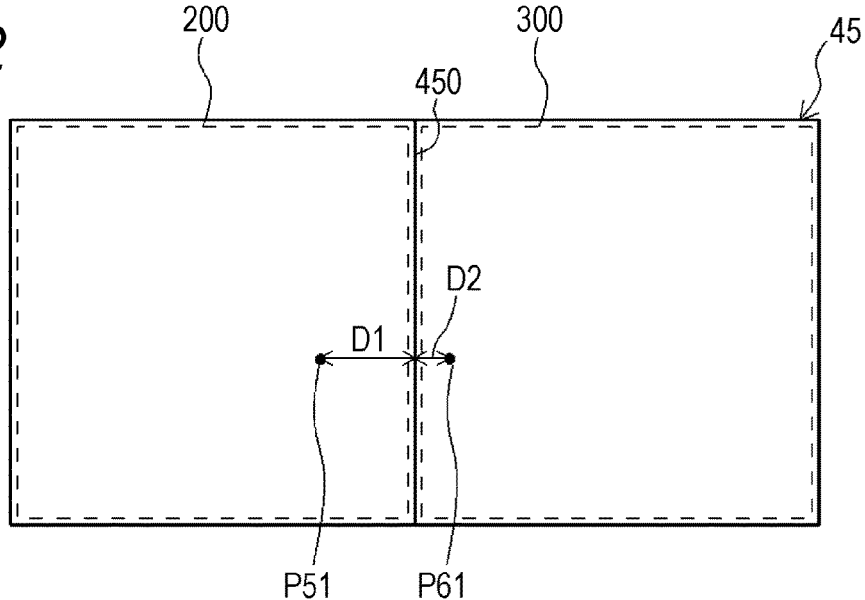
FIG. 12 is a diagram showing the distances from the detected positions (detection start positions) of respective pointers to a boundary line, and the like, according to one or more embodiments of the present invention.

In step S33, the server device 20 determines whether the user operation (the pinch operation) is an operation directed to its own device 20, in accordance with the distances D1 and D2 (FIG. 12) from the respective detected positions P51 (X51, Y51) and P61 (X61, Y61) of the pointers 701 and 702 to the boundary line 450.

Specifically, the server device 20 calculates and compares the distances D1 and D2 (FIG. 12) from the first detected positions P51 and P61 of the pointers 701 and 702 to the boundary line 450, and, in accordance with the comparison result, determines whether the pinch operation is an operation directed to its own device 20.

More specifically, the server device 20 calculates the distance (a distance D1 (FIG. 12) in this example) from the first detected position P51 of the pointer 701 (FIG. 11) on the side of its own device 20 to the boundary line 450 (this distance will be hereinafter also referred to as the "distance on the side of its own device 20"). The server device 20 further calculates the distance (a distance D2 in this example) from the first detected position P61 of the pointer 702 on the side of the other device 30 to the boundary line 450 (this distance will be hereinafter also referred to as the "distance on the side of the other device 30"). The server device 20 then compares the calculated distances D1 and D2 with each other. Here, the server device 20 determines that the distance (D1) on the side of its own device 20 is longer than the distance (D2) on the side of the other device 30.

In a case where the distance (D1) on the side of its own device 20 is longer than the distance (D2) on the side of the other device 30, the process moves from step S33 on to step S14, and the server device 20 determines that the pinch operation by the two pointers 701 and 702 is an operation directed to its own device 20. The process then moves from step S14 on to step S15. In a case where it is determined in step S33 that the distance (D1) on the side of its own device 20 is shorter than the distance (D2) on the side of the other device 30, the process moves from step S33 on to step S18, and the server device 20 determines that the pinch operation is not an operation directed to its own device 20. Further, in a case where the distance on the side of its own device 20 is equal to the distance on the side of the other device 30 (D1=D2), for example, the pinch operation is determined to be an operation directed to a predetermined device (the server device 20, for example).

In step S15, the server device 20 performs the process corresponding to the user operation (the pinch operation). Whether the pinch operation is a pinch-out operation or a pinch-in operation is determined by the movement state of each of the pointers 701 and 702 thereafter. For example, in a case where the distance between the detected positions of the two pointers 701 and 702 is made longer, the user operation is determined to be a pinch-out operation. Conversely, in a case where the distance between the detected positions is shortened, the user operation is determined to be a pinch-in operation.

In the image forming device 30, the same operation as the operation shown in FIG. 13 is performed.

In the image forming device 30, in a case where the pointer 702 has been detected in the divided display region 300 for its own device 30, the process moves from step S31 to step S33 via step S32. The image forming device 30 then compares the distance on the side of its own device 30 with the distance on the side of the other device 20 (step S33).

Specifically, the image forming device 30 calculates the distance (the distance D2 in this example) from the first detected position P61 (FIG. 12) of the pointer 702 (FIG. 11) on the side of its own device 30 to the boundary line 450 (this distance is the distance on the side of its own device 30). The image forming device 30 also calculates the distance (the distance D1 in this example) from the first detected position P51 of the pointer 701 on the side of the other device 20 to the boundary line 450 (this distance is the distance on the side of the other device 20). The image forming device 30 then compares the calculated distance (D2) on the side of its own device 30 with the calculated distance (D1) on the side of the other device 20. In this example, it is determined in step S33 that the distance (D2) on the side of its own device 30 is shorter than the distance (D1) on the side of the other device 20, and the process moves on to steps S18 and S19.

The image forming device 30 then determines that the pinch operation by the two pointers 701 and 702 is not an operation directed to its own device (step S18), and discards the detected position information 150 and 160 received from the operation display 40 (step S19) (see FIG. 11).

In a case where it is determined in step S33 that the distance (D2) on the side of its own device 30 is longer than the distance (D1) on the side of the other device 20, the process moves from step S33 on to step S14, and the image forming device 30 determines that the pinch operation is an operation directed to its own device 30.

As described above, in one or more embodiments of the present invention, in a case where one device (the server device 20, for example) determines that the two pointers 701 and 702 related to a pinch operation have been detected in different divided display regions from each other (FIG. 11), the server device 20 determines that the pinch operation is an operation directed to its own device 20 when the distance (D1 (FIG. 12)) on the side of its own device 20 is longer than the distance (D2) on the side of the other device 30. As a result, the processes corresponding to respective user operations by the pointers 701 and 702 are not performed independently of each other in the respective devices 20 and 30, and the process corresponding to the pinch operation by the two pointers 701 and 702 is performed in the operation target device (the server device 20 in this example) of user operations. Thus, any process not desired by the user can be prevented from being performed in the MFP 10.

One or more embodiments of the present invention are modifications of the aforementioned embodiments. The description below will focus on the differences from the aforementioned embodiments.

In the aforementioned embodiments, in a case where it is determined that a pointer has been detected in the divided display region for its own device, each of the devices 20 and 30 determines, according to the principles, that the user operation by the pointer is an operation directed to its own device (FIG. 6 and others). In other words, the divided display regions (200 and 300) for the respective devices 20 and 30 are used as the operation regions for user operations directed to images displayed in the divided display regions (200 and 300) for the respective devices 20 and 30.

In one or more embodiments of the present invention, such operations are also normally performed in the respective devices 20 and 30. In one or more embodiments of the present invention, however, in a case where predetermined conditions (described later) are satisfied, the divided display region (200) for one device (the server device 20, for example) is exceptionally used as the operation region for a user operation directed to an image displayed in the divided display region 300 for the other device (the image forming device 30) (FIG. 14).

In a case where a viewing image is displayed in the divided display region 300 for the image forming device 30, the user can perform a pinch-out operation (or a pinch-in operation) on the divided display region 300, to enlarge (or reduce) the viewing image. Here, the viewing image is an image that can accept specific operations (such as pinch operations (pinch-out operations and pinch-in operations)). An example of the viewing image is a preview image in a box print job or the like.

However, in a case where a user operation (a pinch operation, for example) is performed on the viewing image displayed in the divided display region 300, part of the viewing image is covered with a finger or the like of the user, as the user operation is performed with the finger or the like touching the divided display region 300. As a result, the user cannot visually recognize the covered portion.

Figure 14:
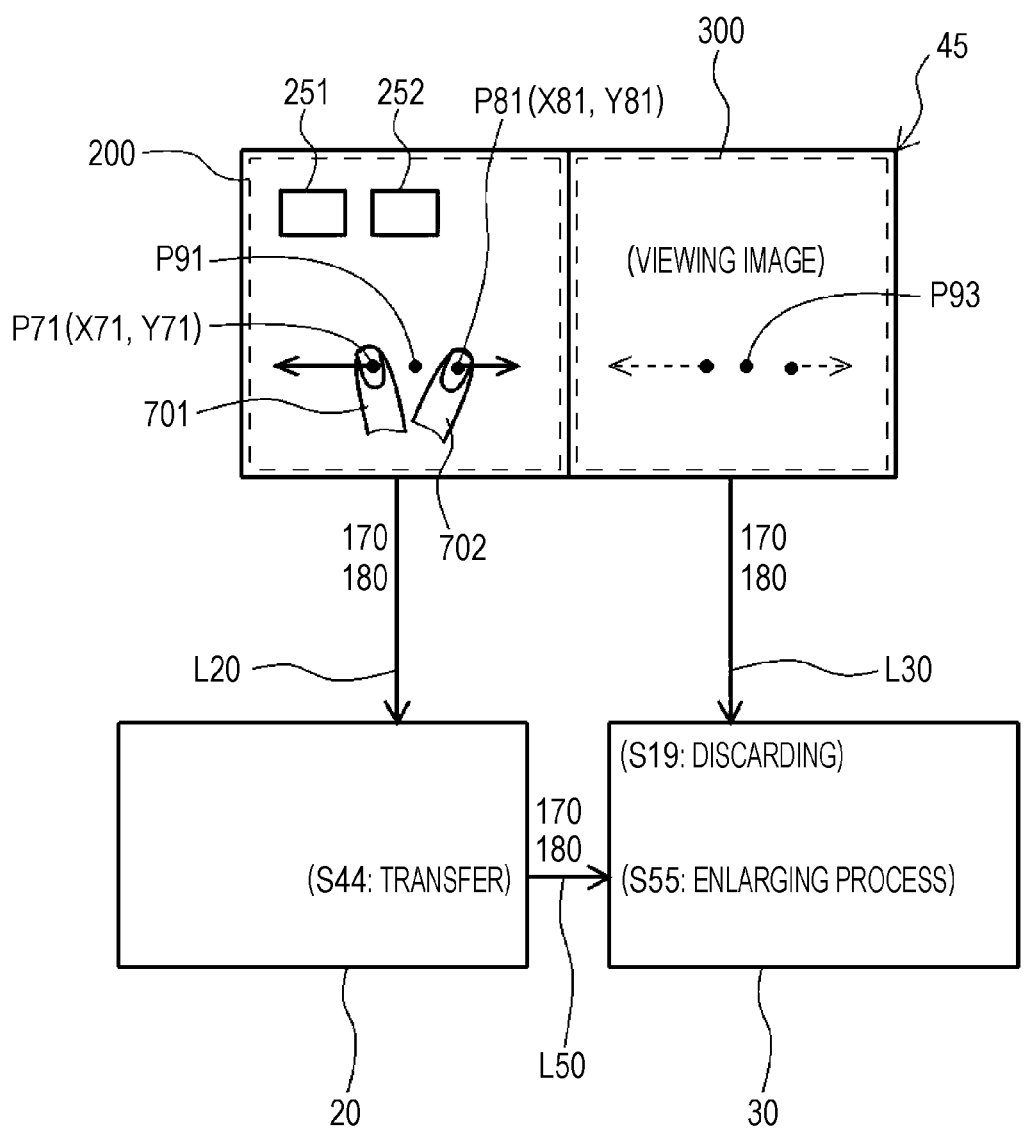
FIG. 14 is a diagram showing a situation where a user operation is performed in the left display region according to one or more embodiments of the present invention.

With this fact being taken into consideration in one or more embodiments of the present invention, in a case where predetermined conditions are satisfied, the divided display region 200 for the server device 20 is exceptionally used as the operation region for a user operation directed to the viewing image displayed in the divided display region 300 for the image forming device 30 (FIG. 14). As a result, while seeing the entire viewing image displayed in the divided display region 300 for the image forming device 30, the user can, for example, enlarge the viewing image, using the divided display region 200 for the server device 20.

First, an operation of the server device 20 is described. In this example, a pointer is detected in the divided display region 200 for the server device 20.

Figure 16:
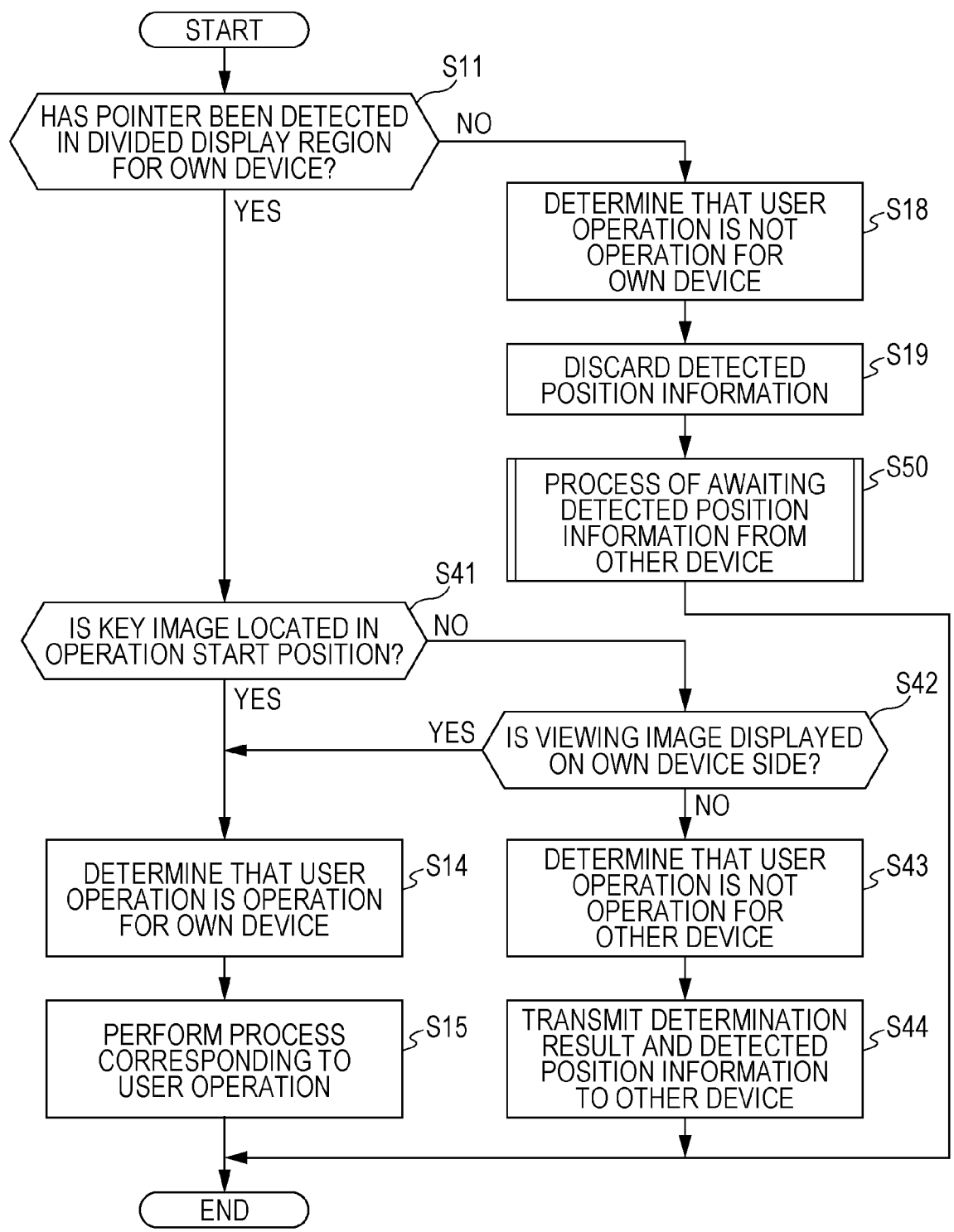
FIG. 16 is a flowchart showing an operation of each device according to one or more embodiments of the present invention.

FIG. 16 is a flowchart showing an operation of the server device 20 according to one or more embodiments of the present invention.

Even in a case where a pointer has been detected on the side of its own device 20, the server device 20 exceptionally determines that the user operation is an operation directed to the image forming device 30 when an operation irrelevant to the content displayed in the divided display region 200 for its own device 20. Specifically, even in a case where a pointer has been detected on the side of its own device 20, the server device 20 exceptionally determines that the user operation is an operation directed to the image forming device 30, when the two conditions described below are both satisfied (step S43). The two conditions are that the detected position of the pointer differs from the disposed positions of display elements for operation inputs, and that the viewing image is not displayed on the side of its own device 20. The server device 20 then transmits a determination result indicating that the user operation is an operation directed to the image forming device 30, to the image forming device 30 (step S44).

Specifically, after step S11, the server device 20 first determines, in step S41, whether display elements for operation inputs (such as key images 251 and 252 (FIG. 14)) exist at the first detected positions P71 and P81 of the pointers 701 and 702 (the operation start position in a pinch operation).

In a case where the display elements for operation inputs exist at the first detected positions P71 (X71, Y71) and P81 (X81, Y81) of the pointers 701 and 702, the process moves from step S41 on to step S14, and the server device 20 determines that the user operation is an operation (an operation to press the display elements, for example) directed to its own device 20.

In a case where the display elements for operation inputs do not exist at the detected positions P71 and P81 of the pointers 701 and 702 (see FIG. 14), on the other hand, the process moves from step S41 on to step S42. In other words, in a case where the detected positions of the pointers differ from the disposed positions of the display elements for operation inputs, the process moves from step S41 on to step S42.

In step S42, the server device 20 determines whether a viewing image is displayed in the divided display region 200 for its own device 20.

In a case where a viewing image (certain still image content or the like) is displayed in the divided display region 200, the process moves from step S42 on to step S14, and the server device 20 determines, according to the principles, that the user operation is an operation directed to its own device 20. The server device 20 then performs the process (such as an enlarging process for the still image content displayed in the divided display region 200) corresponding to the user operation (step S15).

In a case where any viewing image is not displayed in the divided display region 200, on the other hand, the process moves from step S42 on to step S43, and the server device 20 determines that the user operation is not an operation directed to its own device 20, but an operation directed to the other device 30.

The process then moves from step S43 on to step S44, and the server device 20 transmits a determination result indicating that the user operation is an operation directed to the image forming device 30, to the image forming device 30. The server device 20 also transmits (transfers) detected position information 170 and 180 received from the operation display 40 to the image forming device 30 (FIG. 14). The determination result and the detected position information 170 and 180 are transmitted from the server device 20 to the image forming device 30 via a signal line L50 (FIG. 14).

The operation shown in FIG. 16 then comes to an end in the server device 20. However, the server device 20 continuously performs a transfer operation to transfer the detected position information 170 and 180 from the operation display 40 to the image forming device 30 (or repeats the transfer operation). In other words, the detected position information 170 and 180 is updated and transferred from the server device 20 to the image forming device 30 as needed.

Next, an operation of the image forming device 30 is described. In the image forming device 30, the same operation as the operation shown in FIG. 16 is performed.

Even in a case where a pointer has been detected on the side of the other device 20, the image forming device 30 determines that the user operation is a specific operation (such as a pinch operation) directed to its own device 30, when a determination result indicating that the user operation is an operation directed to the image forming device 30 is received from the other device 20, and a viewing image is displayed on the side of its own device 30. The image forming device 30 then performs the process corresponding to the specific operation in the divided display region 300 for its own device 30.

Specifically, the image forming device 30 first determines, in step S11, that any pointer has not been detected in the divided display region 300 for its own device 30, and the process moves from step S11 on to step S18. According to the basic operation, the image forming device 30 then (provisionally) determines that the user operation is not an operation directed to its own device 30 (step S18), and discards the detected position information 170 and 180 received (directly) from the operation display 40 (step S19) (see FIG. 14).

The process then moves from step S19 on to step S50.

Figure 17:
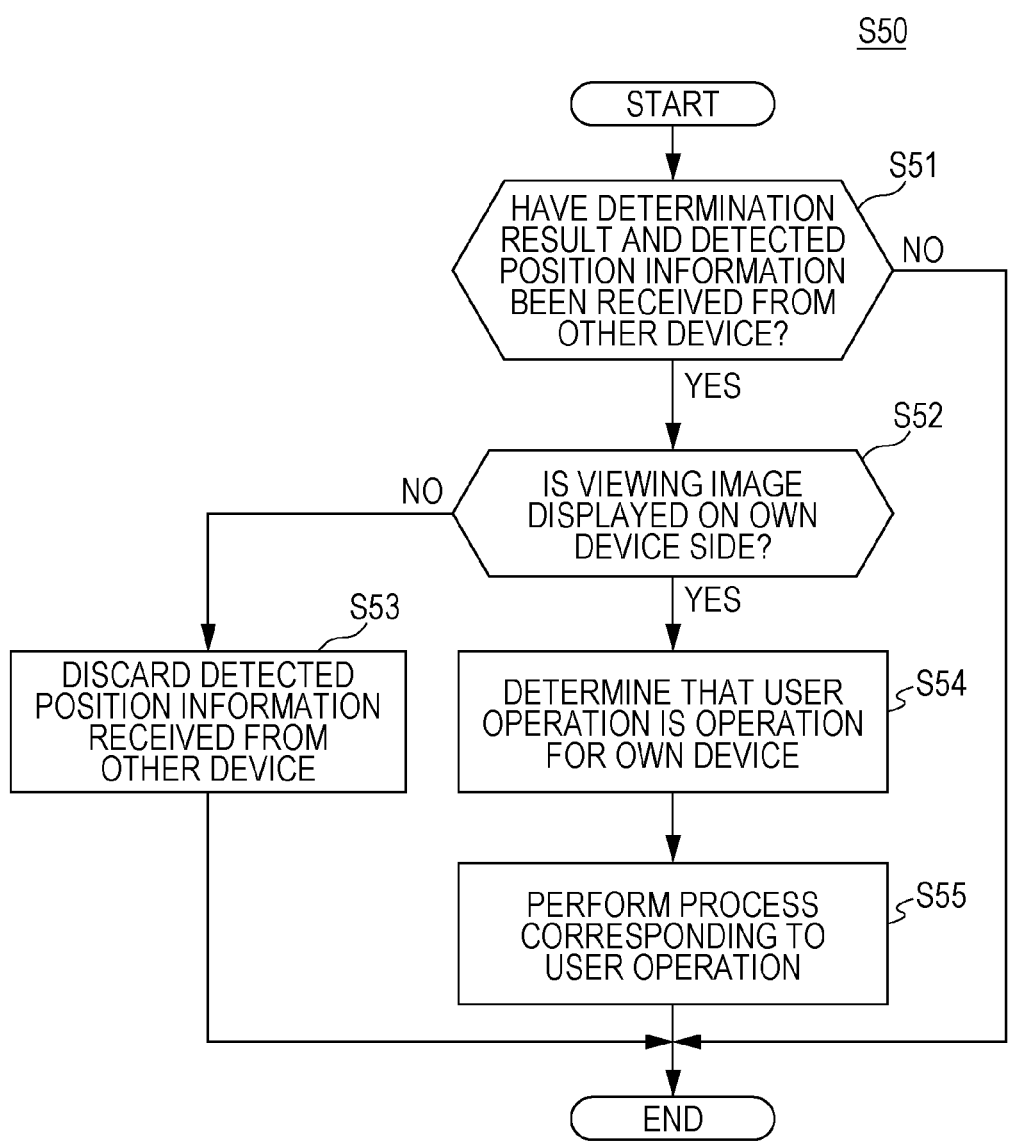
FIG. 17 is a flowchart showing a subroutine process related to a process of awaiting detected position information from the other device according to one or more embodiments of the present invention.

In step S50, the image forming device 30 performs a process of awaiting detected position information 100 from the other device 20. FIG. 17 is a diagram showing the subroutine process in step S50.

In step S51, the image forming device 30 determines whether a determination result indicating that the user operation is an operation directed to the image forming device 30, and the detected position information 100 have been received from the other device 20. In this example, the determination result and the detected position information 170 and 180 have been transmitted from the server device 20 to the image forming device 30 (step S44) as described above, and the image forming device 30 determines, in step S51, that the determination result and the detected position information 100 have been received from the other device 20. The process then moves from step S51 on to step S52.

In step S52, the image forming device 30 determines whether a viewing image is displayed in the divided display region 300 for its own device 30.

For example, in a case where an image for setting various kinds of jobs (an image through which any pinch operation cannot be accepted) is displayed in the divided display region 300, the image forming device 30 determines, in step S52, that any viewing image is not displayed in the divided display region 300 for its own device 30.

The process then moves from step S52 on to step S53, and the image forming device 30 discards the detected position information 170 and 180 received (transferred) from the server device 20.

In a case where a preview image in a box print job or the like is displayed in the divided display region 300, on the other hand, the image forming device 30 determines, in step S52, that a viewing image is displayed in the divided display region 300 for its own device 30.

The process then moves from step S52 on to step S54, and the image forming device 30 determines that the user operation is a specific operation (a pinch operation, for example) directed to its own device 30.

As described above, even in a case where it is determined that a pointer has been detected on the side of the other device 20 (step S11), the image forming device 30 exceptionally determines that the user operation is an operation directed to its own device 30, when a determination result indicating that the user operation is an operation directed to the image forming device 30 is received from the other device 20, and a viewing image is displayed on the side of its own device 30.

The process then moves from step S54 on to step S55, and the image forming device 30 performs the process (an enlarging process) corresponding to the user operation (a pinch-out operation directed to the divided display region 300, in accordance with the detected position information 170 and 180 (FIG. 14) received from the server device 20. Specifically, the image forming device 30 calculates a position that is in the divided display region 300 and corresponds to the detected position of the pointer in the divided display region 200, and performs a process of enlarging the viewing image, with the calculated position being the reference point. More specifically, the image forming device 30 calculates a midpoint P91 between the detected position P71 (FIG. 14) of one pointer 701 in the divided display region 200 for the other device 20 and the detected position P81 of the other pointer 702, and also calculates the position P93 corresponding to the midpoint P91 in the divided display region 300 as the reference position (the reference point) in the enlarging process in the divided display region 300. In the divided display region 300, the position P93 is a position having the same coordinate value as the coordinate value in the divided display region 200, for example. Further, the image forming device 30 calculates the enlargement ratio in the enlarging process in accordance with the amounts of movement of the respective pointers 701 and 702. The image forming device 30 then performs the enlarging process (a viewing image enlarging process) to enlarge the viewing image at the enlargement ratio, with the calculated reference position P93 serving as the reference point. Note that the present invention is not limited to this, and a viewing image enlarging process may be performed, with the reference point being the center point of the divided display region 300 for the image forming device 30.

In this example, even after the determination result is received from the server device 20, the image forming device 30 continues to perform the process corresponding to the user operation, using the detected position information 170 and 180 transferred from the server device 20.

As described above, in one or more embodiments of the present invention, in a case where the detected position of a pointer detected on the side of its own device 20 differs from the disposed positions of the key images 251 and 252 and the like (FIG. 14), and an image through which a specific operation (such as a pinch operation) can be accepted is not displayed on the side of its own device 20, the server device 20 determines that the user operation is not an operation directed to its own device 20 (step S43). A determination result indicating that the user operation is an operation directed to the image forming device 30 is then transmitted from the server device 20 to the image forming device 30. In the image forming device 30, when a specific image capable of accepting the specific operation (a pinch operation or the like) is displayed on the side of its own device 30, and the determination result is received from the server device 20, the user operation is determined to be the specific operation directed to its own device 30 (step S54). In short, the divided display region 200 for the server device 20 is used as the operation region for the specific operation directed to the viewing image displayed in the divided display region 300 for the image forming device 30.

Accordingly, the user performs a pinch-out operation or the like in the divided display region 200 for the server device 20, so that an enlarging process or the like for the viewing image displayed in the divided display region 300 for the image forming device 30 can be performed. In other words, while seeing the entire viewing image displayed in the divided display region 300 for the image forming device 30, the user can, for example, enlarge the viewing image, using the divided display region 200 for the server device 20. Thus, user-friendliness can be increased.

In the above described embodiments, even after the determination result indicating that the user operation is an operation directed to the image forming device 30 has been received from the server device 20, the image forming device 30 continues to perform the process corresponding to the user operation (FIG. 14), using the detected position information 170 and 180 transferred from the server device 20. However, the present invention not limited to this operation.

In a case where the detected position information 100 is transferred from one device (the server device 20 in this example) to the other device (the image forming device 30), the responsiveness of the process corresponding to the user operation becomes lower in the other device (30). Specifically, the time (responsiveness) from a pinch-out operation on the side of the server device 20 till execution (reflection) of an enlarging process on the side of the image forming device 30 becomes longer than that in a case where the enlarging process is performed with the detected position information 100 received directly from the operation display 40.

Figure 15:
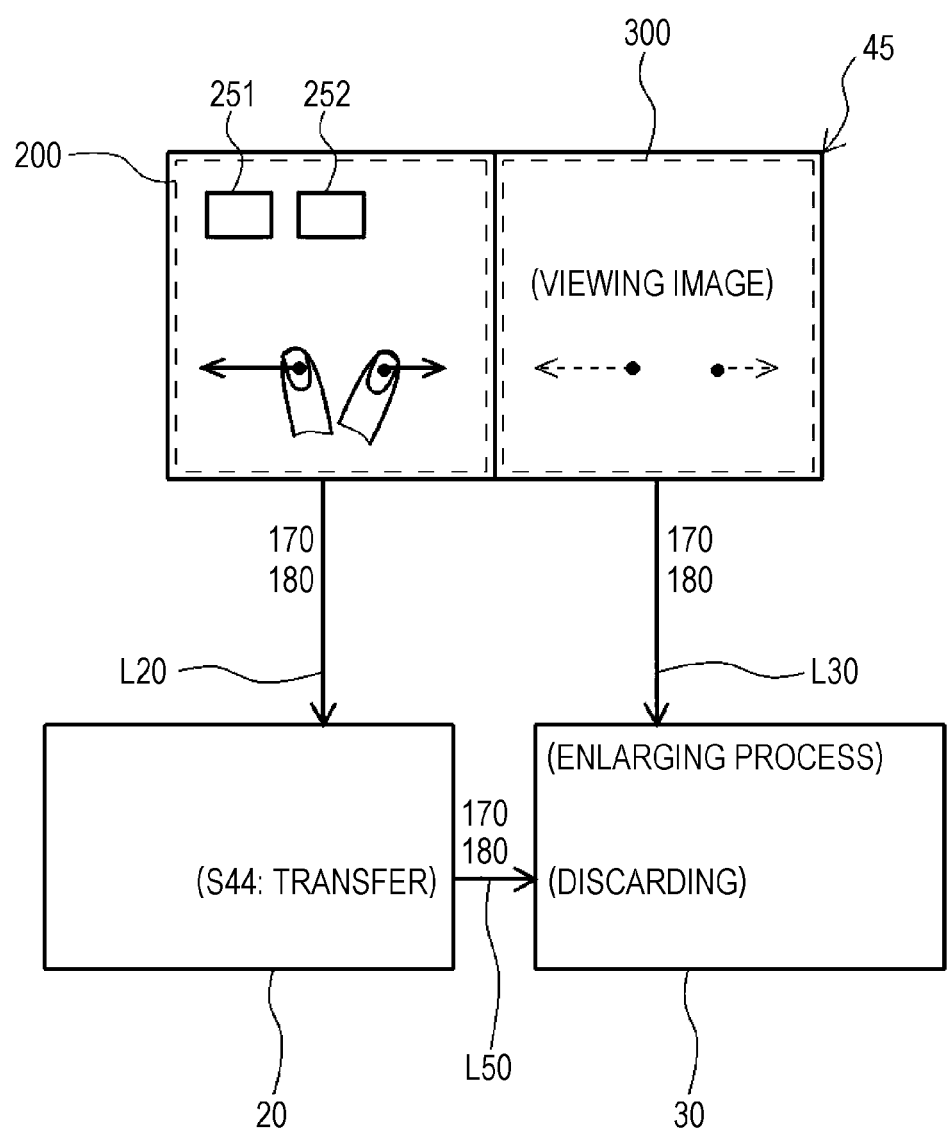
FIG. 15 is a diagram showing a situation where a user operation is performed in the left display region according to one or more embodiments of the present invention.

With this fact being taken into account, after receiving the determination result from the server device 20, the image forming device 30 may perform the process corresponding to the user operation, using the detected position information 170 and 180 received directly from the operation display 40 (FIG. 15). Note that, after the determination result is received from the server device 20, the image forming device 30 may discard the detected position information 170 and 180 transferred from the server device 20 (FIG. 15).

As the detected position information 170 and 180 received directly from the operation display 40 is used, it is possible to reduce the decrease in the responsiveness of the process corresponding to the user operation.

Note that the image forming device 30 may perform the process corresponding to a user operation, using not only the detected position information 170 and 180 received directly from the operation display 40 after receiving a determination result indicating that the user operation is an operation directed to the image forming device 30, but also the detected position information 170 and 180 received directly from the operation display 40 prior to the reception of the determination result. Specifically, the image forming device 30 may store the detected position information 170 and 180 received from the operation display 40, without discarding the detected position information 170 and 180. In accordance with the determination result (the determination result received from the server device 20), the image forming device 30 may perform the process (a process of identifying the start point of a pinch operation, for example) corresponding to the user operation, using the detected position information 170 and 180 received from the operation display 40.

Also, in the above described embodiments, the divided display region 200 for the server device 20 is used as the operation region for a specific operation directed to a viewing image (a preview image or the like) displayed in the divided display region 300 for the image forming device 30. However, the present invention is not limited to this operation. Conversely, the divided display region 300 for the image forming device 30 may be used as the operation region for a specific operation directed to a viewing image (still image content or the like) displayed in the divided display region 200 for the server device 20.

<4. Modifications>

Although the embodiments of the present invention have been described so far, the present invention is not limited to the above described embodiments.

For example, in each of the above embodiments and the like, two devices (the server device 20 and the image forming device 30) are provided in an information processing apparatus (the MFP 10) (FIG. 2). However, three or more devices may be provided in an information processing apparatus.

In each of the above embodiments and the like, the MFP 10 (FIG. 1) is an example of the information processing apparatus that performs the operation shown in FIG. 9 and the like. However, the information processing apparatus may be any other appropriate apparatus (such as a personal computer).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing apparatus comprising:
a plurality of devices each comprising a hardware processor; and
a display shared among the devices, wherein
in response to detecting a first pointer in a display region of the display, the display transmits detected position information indicating a detected position of the first pointer to each of the devices,
the hardware processor of one of the devices determines whether a user operation by the first pointer is an operation directed to the one of the devices, in accordance with the detected position information received from the display, the display region is divided into a plurality of display regions corresponding to the plurality of devices, respectively, the display displays, on each of the divided display regions, an image received from the respective device, and transmits the detected position information to each of the devices in response to detection of the first pointer in the display region, the plurality of devices comprises a first device comprising a first hardware processor among the hardware processors, upon determining from the detected position information that the first pointer is detected in a first divided display region among the divided display regions that displays the image related to the first device, the first hardware processor determines that the user operation is an operation directed to the first device, upon determining from the detected position information that the first pointer is detected in a second divided display region that is one of the divided display regions different from the first divided display region, the first hardware processor determines that the user operation is not the operation directed to the first device, and the detected position information includes a plurality of touch coordinate positons of the first pointer during a period from detection of the first pointer till detachment of the first pointer from the display.

2. The information processing apparatus according to claim 1, wherein upon determining that the user operation is directed to the one of the devices, the hardware processor of the one of the devices executes a process corresponding to the user operation, in accordance with the detected position information.

3. The information processing apparatus according to claim 1, wherein upon determining that the user operation is not directed to the one of the devices, the hardware processor of the one of the devices discards the detected position information received from the display.

4. The information processing apparatus according to claim 1, wherein when a predetermined condition is satisfied, the first hardware processor determines that the user operation is the operation directed to the first device, regardless of whether the first hardware processor determines from the detected position information that the first pointer is detected in the second divided display region.

5. The information processing apparatus according to claim 4, wherein the predetermined condition includes a condition that the first pointer has passed through a boundary between the first divided display region and the second divided display region while a pressing operation by the first pointer started in the first divided display region is continued, and the first pointer is detected in the second divided display region.

6. The information processing apparatus according to claim 4, wherein the predetermined condition includes a condition that the first pointer has passed through a boundary between the first divided display region and the second divided display region while a pressing operation by the first pointer is continued from a time when an operation for moving a display element in the first divided display region was started, and the first pointer is detected in the second divided display region, and when the predetermined condition is satisfied, the first hardware processor determines that the user operation is the operation directed to the first device, and the operation for moving the display element in the first divided display region is being continued.

7. The information processing apparatus according to claim 4, wherein the predetermined condition includes a condition that the first pointer has passed through a boundary between the first divided display region and the second divided display region while a pressing operation by the first pointer and a second pointer is continued from a time when a pinch-out operation using the first pointer and the second pointer was started in the first divided display region, and the first pointer is detected in the second divided display region, and when the predetermined condition is satisfied, the first hardware processor determines that the user operation is the operation directed to the first device, and the pinch-out operation in the first divided display region is being continued.

8. The information processing apparatus according to claim 1, wherein when a predetermined condition is satisfied, the first hardware processor determines that the user operation is not the operation directed to the first device, regardless of whether the first hardware processor determines from the detected position information that the first pointer is detected in the first divided display region.

9. The information processing apparatus according to claim 8, wherein the predetermined condition includes a condition that the first pointer has passed through a boundary between the second divided display region and the first divided display region while a pressing operation by the first pointer started in the second divided display region is continued, and the first pointer is detected in the first divided display region.

10. The information processing apparatus according to claim 1, wherein the devices are accommodated in one casing.

11. The information processing apparatus according to claim 1, wherein the information processing apparatus is an image processing apparatus.

12. An information processing apparatus comprising:

a plurality of devices each comprising a hardware processor; and a display shared among the devices, wherein in response to detecting a first pointer in a display region of the display, the display transmits detected position information indicating a detected position of the first pointer to each of the devices, the hardware processor of one of the devices determines whether a user operation by the first pointer is an operation directed to the one of the devices, in accordance with the detected position information received from the display, the display region is divided into a plurality of display regions corresponding to the plurality of devices, respectively, the display displays, on each of the divided display regions, an image received from the respective device, and transmits the detected position information to each of the devices in response to detection of the first pointer in the display region, the plurality of devices comprises a first device comprising a first hardware processor among the hardware processors, upon determining from the detected position information that the first pointer is detected in a first divided display region among the divided display regions that displays the image related to the first device, the first hardware processor determines that the user operation is an operation directed to the first device, upon determining from the detected position information that the first pointer is detected in a second divided display region that is one of the divided display regions different from the first divided display region, the first hardware processor determines that the user operation is not the operation directed to the first device, when a predetermined condition is satisfied, the first hardware processor determines that the user operation is the operation directed to the first device, regardless of whether the first hardware processor determines from the detected position information that the first pointer is detected in the second divided display region, when the first pointer and a second pointer are detected in the display region within a predetermined short period, and when the first hardware processor determines from the detected position information that one of the first pointer and the second pointer is detected in the first divided display region while another of the first pointer and the second pointer is detected in the second divided display region, the first hardware processor calculates a first distance and a second distance, the first distance being a distance from a boundary between the first divided display region and the second divided display region to a detected position of the one of the first pointer and the second pointer, and the second distance being a distance from the boundary to a detected position of the other of the first pointer and the second pointer, and when a condition that the first pointer and the second pointer are detected within the predetermined short period and the first distance is longer than the second distance is satisfied, the first hardware processor determines that the user operation is a pinch operation directed to the first device.

13. An information processing apparatus comprising:

a plurality of devices each comprising a hardware processor; and a display shared among the devices, wherein in response to detecting a first pointer in a display region of the display, the display transmits detected position information indicating a detected position of the first pointer to each of the devices, the hardware processor of one of the devices determines whether a user operation by the first pointer is an operation directed to the one of the devices, in accordance with the detected position information received from the display, the display region is divided into a plurality of display regions corresponding to the plurality of devices, respectively, the display displays, on each of the divided display regions, an image received from the respective device, and transmits the detected position information to each of the devices in response to detection of the first pointer in the display region, the plurality of devices comprises a first device comprising a first hardware processor among the hardware processors, upon determining from the detected position information that the first pointer is detected in a first divided display region among the divided display regions that displays the image related to the first device, the first hardware processor determines that the user operation is an operation directed to the first device, upon determining from the detected position information that the first pointer is detected in a second divided display region that is one of the divided display regions different from the first divided display region, the first hardware processor determines that the user operation is not the operation directed to the first device, when a predetermined condition is satisfied, the first hardware processor determines that the user operation is not the operation directed to the first device, regardless of whether the first hardware processor determines from the detected position information that the first pointer is detected in the first divided display region, the devices further comprise a second device that is different from the first device and comprises a second hardware processor among the hardware processors, among the divided display regions, the second divided display region is a divided display region that displays an image relating to the second device, when the predetermined condition is satisfied, the first hardware processor determines that the user operation is not the operation directed to the first device but an operation directed to the second device, and transmits, to the second device, a determination result indicating that the user operation is the operation directed to the second device, regardless of whether the second hardware processor determines from the detected position information that the first pointer is detected in the first divided display region, and when a specific image capable of accepting a specific operation is displayed in the second divided display region, and when the determination result is received from the first device, the first hardware processor determines that the user operation is the operation directed to the second device and is the specific operation directed to the specific image, regardless of whether the second hardware processor determines from the detected position information that the first pointer is detected in the first divided display region.

14. The information processing apparatus according to claim 13, wherein the specific image includes a viewing image, and the specific operation includes a pinch operation.

15. The information processing apparatus according to claim 13, wherein the predetermined condition includes a condition that a detected position of the first pointer differs from a position of a display element for an operation input, and a condition that the image capable of accepting the specific operation is not displayed in the first divided display region.

16. The information processing apparatus according to claim 13, wherein upon determining, from the detected position information received from the display, that the user operation is the operation directed to the second device, the first hardware processor transfers the detected position information received from the display to the second device, and upon determining that the user operation is the specific operation directed to the second device, the second hardware processor executes a process corresponding to the specific operation in the second divided display region, in accordance with the detected position information received from the first device.

17. The information processing apparatus according to claim 13, wherein after receiving the determination result from the first device, the second hardware processor executes a process corresponding to the specific operation in the second divided display region, in accordance with the detected position information received from the display.

18. A method of controlling an information processing apparatus including a plurality of devices, the method comprising:

transmitting, with a display provided in the information processing apparatus and shared among the devices, detected position information indicating a detected position of a first pointer to each of the devices, in response to detection of the first pointer in a display region of the display; and determining, with a hardware processor of one of the devices, whether a user operation by the first pointer is an operation directed to the one of the devices, in accordance with the detected position information received from the display, wherein the display region is divided into a plurality of display regions corresponding to the plurality of devices, respectively, the method further comprises:

displaying, on each of the divided display regions of the display, an image received from the respective device, and transmitting the detected position information to each of the devices in response to detection of the first pointer in the display region, the plurality of devices comprises a first device comprising a first hardware processor among the hardware processors, the method further comprises:

upon determining from the detected position information that the first pointer is detected in a first divided display region among the divided display regions that displays the image related to the first device, determining, with the first hardware processor, that the user operation is an operation directed to the first device; and upon determining from the detected position information that the first pointer is detected in a second divided display region that is one of the divided display regions different from the first divided display region, determining, with the first hardware processor, that the user operation is not the operation directed to the first device, and the detected position information includes a plurality of touch coordinate positons of the first pointer during a period from detection of the first pointer till detachment of the first pointer from the display.

19. A non-transitory recording medium storing a computer readable program causing a computer incorporated in a first device among a plurality of devices of an information processing apparatus each comprising a hardware processor, the computer readable program causing the computer to execute:

receiving detected position information transmitted to each of the devices in response to detection of a first pointer in a display region of a display, the detected position information indicating a detected position of the first pointer detected in the display region of the display, and the display being provided in the information processing apparatus and shared between the devices; and determining whether a user operation by the first pointer is an operation directed to the first device, in accordance with the detected position information received from the display, wherein the display region is divided into a plurality of display regions corresponding to the plurality of devices, respectively, the computer further executes:

displaying, on each of the divided display regions, an image received from the respective device, and transmitting the detected position information to each of the devices in response to detection of the first pointer in the display region, the plurality of devices comprises a first device comprising a first hardware processor among the hardware processors, the computer further executes:

upon determining from the detected position information that the first pointer is detected in a first divided display region among the divided display regions that displays the image related to the first device, determining, with the first hardware processor, that the user operation is an operation directed to the first device; and upon determining from the detected position information that the first pointer is detected in a second divided display region that is one of the divided display regions different from the first divided display region, determining, with the first hardware processor, that the user operation is not the operation directed to the first device, and the detected position information includes a plurality of touch coordinate positons of the first pointer during a period from detection of the first pointer till detachment of the first pointer from the display.

* * * * *